(12) United States Patent
Pasalapudi et al.

(10) Patent No.: US 10,739,944 B1
(45) Date of Patent: Aug. 11, 2020

(54) SYSTEM AND METHOD FOR GENERATING USER INTERFACE DATA TO PROVIDE INDICATORS ASSOCIATED WITH CONTENT

(71) Applicant: AMAZON TECHNOLOGIES, INC., Seattle, WA (US)

(72) Inventors: Manikanta Aditya Pasalapudi, Hyderabad (IN); Varun Jakhoria, Pilani (IN); Ashish Singh, Hyderabad (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 447 days.

(21) Appl. No.: 15/428,315

(22) Filed: Feb. 9, 2017

(51) Int. Cl.
*G06F 3/0482* (2013.01)
*H04N 21/472* (2011.01)

(52) U.S. Cl.
CPC ..... *G06F 3/0482* (2013.01); *H04N 21/47217* (2013.01)

(58) Field of Classification Search
CPC .................................................. G06F 3/0482
See application file for complete search history.

(56) References Cited

U.S. PATENT DOCUMENTS

| 2010/0232643 | A1* | 9/2010 | Chen | G06K 9/4671 382/103 |
| 2015/0373281 | A1* | 12/2015 | White | G06F 16/435 348/660 |

\* cited by examiner

*Primary Examiner* — Andrea C Leggett
(74) *Attorney, Agent, or Firm* — Lindauer Law, PLLC

(57) ABSTRACT

A system for generating heat map data for content. The system may include a user device, which may capture user input to begin presentation of the content and stop presentation of the content. The user device may also capture information associated with a time interval associated with the user input. The time interval may include a start time and an end time. The user device may send the user input and the information to a server. The server may collect user inputs and information from multiple user devices which are used to generate user interface data. The user interface data may be configured to cause a depiction of a user interface element. The user interface element may include one or more indicators that identify an interest portion associated with the time interval within the content. The indicators enable a user to locate or know interesting portions within the content.

20 Claims, 12 Drawing Sheets

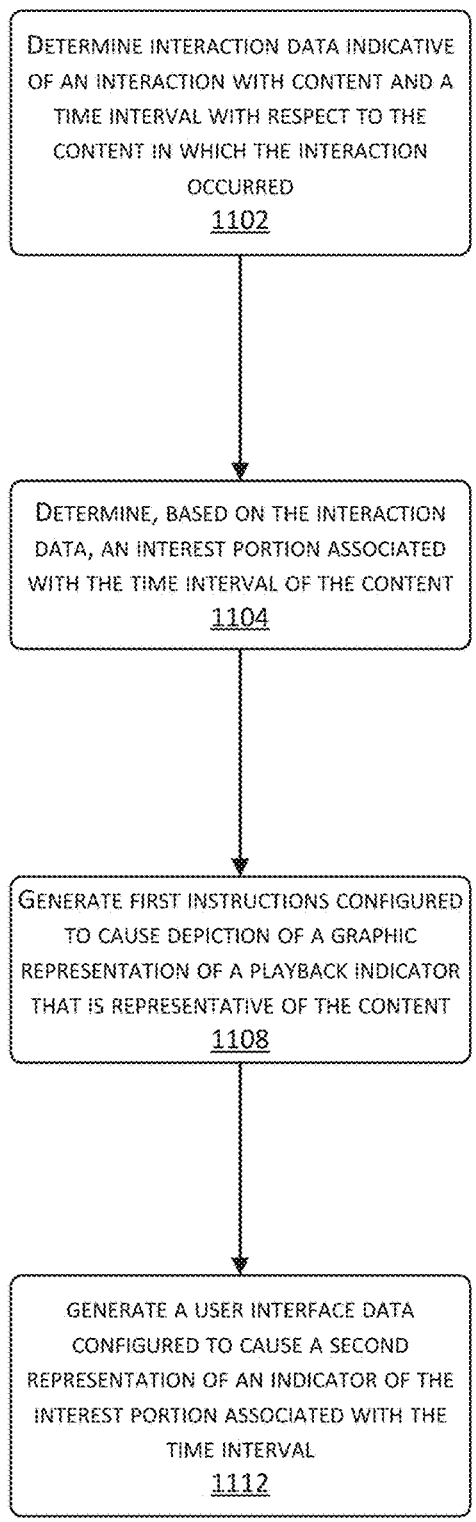
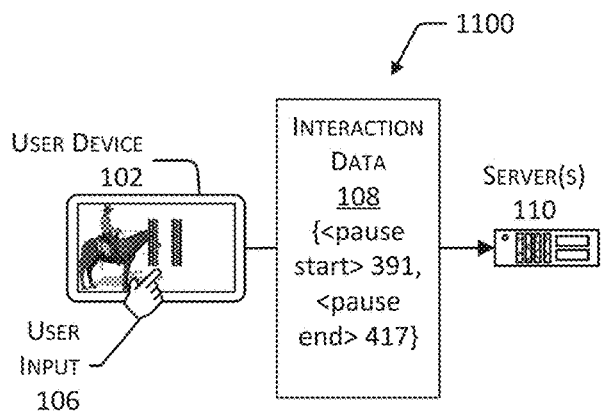
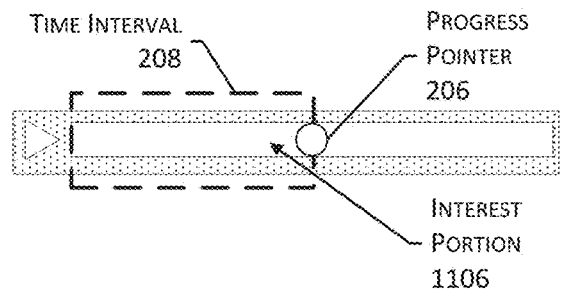
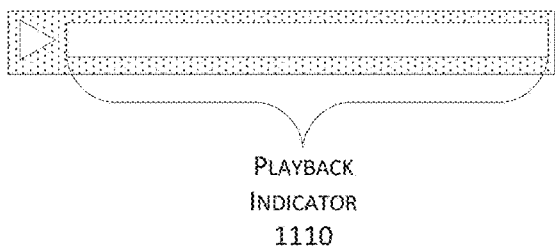
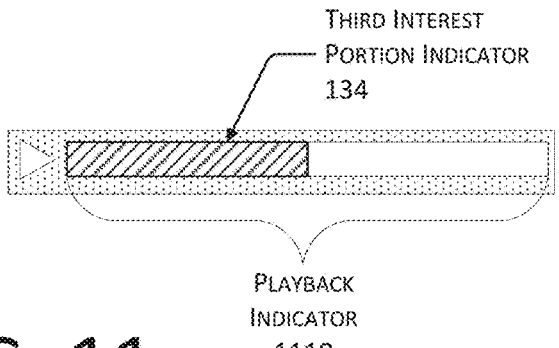
FIG. 11

SYSTEM AND METHOD FOR GENERATING USER INTERFACE DATA TO PROVIDE INDICATORS ASSOCIATED WITH CONTENT

BACKGROUND

Media player technologies have enabled users to play, pause, seek, fast forward, and so forth through media content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 depicts a flow diagram of a process for generating user interface data to provide indicators associated with content.

Figure 1:
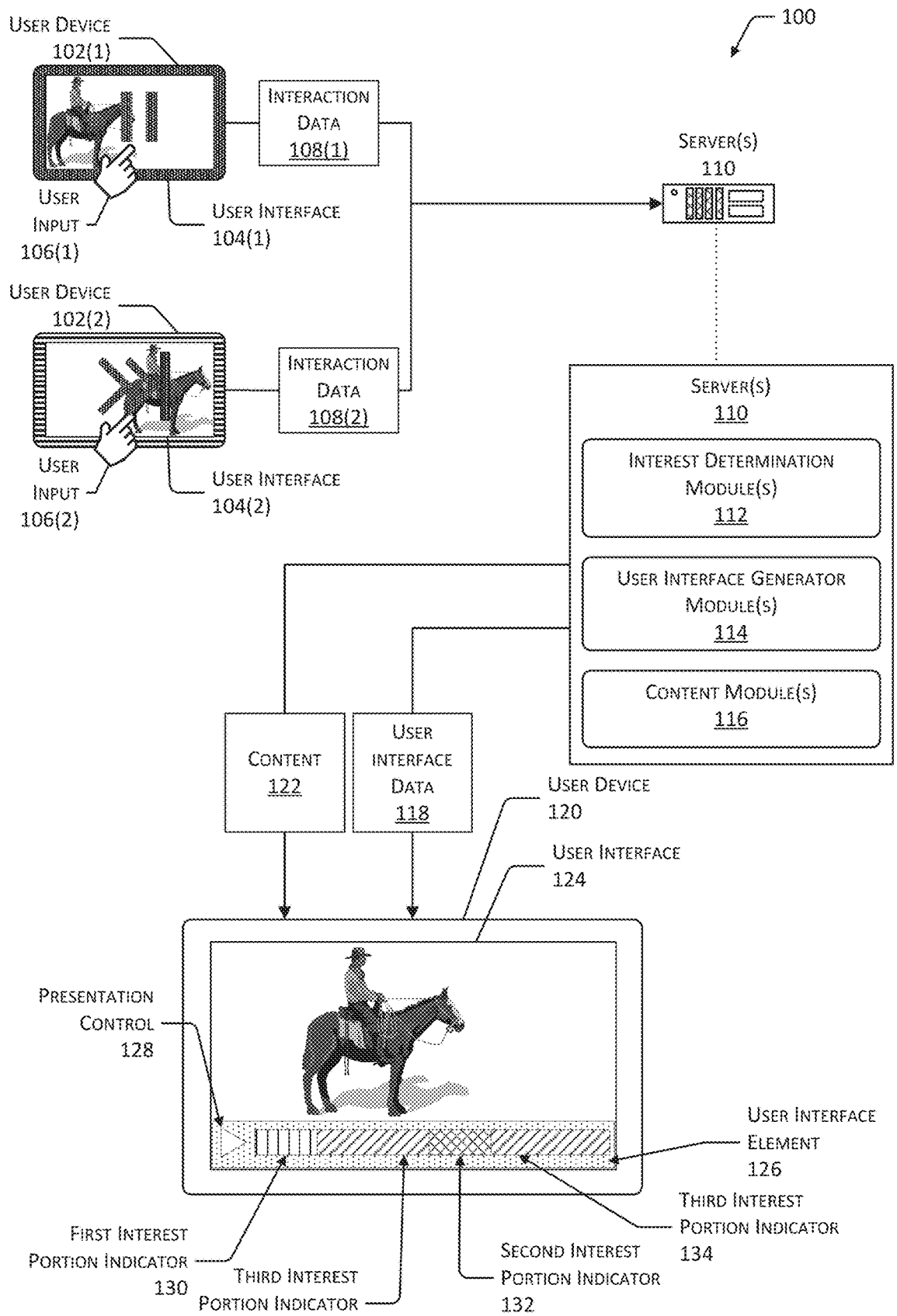
FIG. 1 depicts a schematic of a system for generating user interface data to provide indicators associated with content.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Content distribution services provide users with the ability to watch content such as videos including movies, television series, self-published videos, and so forth, and listen to audio content such as music, audiobooks, and so forth. Content may be part of a subscription plan, rented, purchased, checked out, or otherwise provided to the user. Content distribution services may provide a user interface to depict a playback indictor during the presentation of the content. However, users may have difficulty in locating interesting portions within the content. For example, a user may be watching a how-to video and the user may be interested in viewing a particular portion, such as the second step. To find this particular portion the user may fast forward through the content or skip portions of the content in an attempt to locate the particular portion. This may lead to the user skipping important portions of the video, and wasting time, network bandwidth, computing resources, and so forth in trying to locate the particular portion they desire.

This disclosure describes systems and methods for generating user interface data to provide indicators in a user interface that are associated with content. The system may include a user device, which may capture user input to begin presentation of the content and stop presentation of the content. For example, a user may have begun presentation of a how-to video on how to iron a dress shirt and paused the presentation of the how-to video after a particular step had been completed in the video. The user device may also capture information associated with a time interval associated with the user input. For example, the user device may capture a first time index of 00:03:12 (hours:minutes:seconds) associated with the playing of the content and a second time index 00:05:18 associated with the pausing of the content. The user device may send the user input and the information to a server. The server may collect user inputs and information from multiple user devices and generate user interface data based on those user inputs and information. The user interface data may be configured to cause a depiction of a user interface element. For example, the user interface element may include a playback indicator that is representative of the content and a pointer configured to depict a relative position in the content as a position on the playback indicator. The user interface element may include one or more indicators that identify an interest portion associated with the time interval within the content. For example, the indicator associated with the time indices 00:03:12 to 00:05:18 may be represented by the color red, which indicates that most users have viewed that portion of the content. The indicators enable a user to locate or recognize interesting portions within the content.

During implementation, the operation of the system may include a user device configured to provide users with the ability to view or listen to content such as movies, television series, self-published videos, or listen to music, listen to audiobooks, and so forth. The user device may be a desktop computer, a tablet computer, a wearable computer, an e-book reader, a media device, a cellular phone, a smartphone, a laptop computer, or another suitable apparatus. The user device may provide a user interface configured to receive a user input to present the content. The user device may capture the user input to present the content as well as additional information such as data indicative of an index, such as a start time index and a stop time index associated with the presentation of the content. The user device, content service, or other source may provide information about the user input to an interest determination service.

The interest determination service may be a collection service. The interest determination service may be configured to collect user inputs and information from multiple user devices. The interest determination service may send the user inputs and information to a user interface generator service. In other implementations, a user interface generator service may send a request to the interest determination service to provide the user inputs and the information associated with the presentation of the content. The interest determination service, upon receipt of the request may send the user inputs and information to the user interface generator service.

The user interface generator service may be configured to determine visual indicators that correspond to particular portions of the content. For example, portions of the content that most users skip may be represented by a visual indicator such as the color red. The user interface generator service may generate a playback indicator that is representative of the content and a pointer configured to depict a relative position in the content as a position on the playback indicator. The user interface generator may generate user interface data configured to cause a depiction of a user interface element that includes an overlay to the playback indicator. The overlay may be configured to depict the visual indicators that correspond to particular portions of the content. The overlay may have indicators that identify a type of interaction associated with a portion of the content. For example, the indicators may be colors such as red, yellow, and green. The portions of the content that are identified with the color green may represent that most users have skipped those portions of the content. The portions of the content that are identified with the color yellow may represent that most users have fast forwarded through those portions of the content. The portions of the content that are identified with the color red may represent that most users have viewed those portions of the content. The indicators enable a user to locate or recognize interesting portions within the content.

For example, a user may have selected to view a how-to video on how to iron a dress shirt. The how-to iron a dress shirt may have six steps with each step being associated with a portion of the content. The first step may be to gather up all the necessary tools, such as getting the ironing board, spray bottle full of water, iron, and dress shirt to be ironed. The portion associated with this first step may be identified in the user interface by the color green which indicates that most users have skipped the first step. The second step may be to place the dress shirt on the ironing board. The portion associated with the second step may be identified in the user interface by the color yellow which indicates that most users have fast forwarded through this portion of the content. The third step may be how to iron the collar of the dress shirt. The portion associated with the third step may be identified in the user interface by the color red which indicates that most users have viewed this portion of the content. The fourth step may be how to iron the body of the dress shirt. The portion associated with the fourth step may be identified in the user interface by the color yellow which indicates that most users have fast forwarded over this portion of the content. The fifth step may be how to iron the sleeves of the dress shirt. The portion associated with the fifth step may be identified in the user interface by the color red which indicates that most users have viewed this portion of the content. The sixth step may be how to hang the dress shirt properly on a hanger. The portion associated with the sixth step may be identified in the user interface by the color green which indicates that most users have skipped over this portion of the content. In this example, the user may be interested in viewing portions of the content that were most viewed and to skip content that is associated with the color green and yellow. The user device may be configured such that during playback of the how-to video, the user device or video playback software automatically removes or skips the portions of the content associated with the colors green and yellow. In addition, the indicators enable the user to locate interesting portions within the content, such as how to iron the sleeves of a dress shirt.

The user interface generator may also include indicators to adjust the volume for particular portions of the content or adjust the screen resolution or screen size for particular portions of the content. For example, the audio for a particular portion of the content may be poor or difficult to hear. The user interface generator may include an indicator that denotes that a user should turn the volume up for this particular portion of the content or cause the user device to automatically increase the volume for that particular portion of the content.

By using the techniques and systems described above, user experience is improved as the user interface depicting the portions of interest enable a user to view the portions of the content that have been the most viewed and skip over the portions of the content that have been less viewed. By providing indicators that correspond to particular portions of the content the amount of time a user views the content and searches for particular portions within the content is minimized. Reducing the amount of time a user searches for particular portions within the content reduces processor requirements, network bandwidth, memory allocation, and so forth.

Illustrative System

FIG. 1 depicts a schematic of a system 100 for generating user interface data to provide indicators associated with content. The system 100 may include user devices 102(1), 102(2), . . . , 102(D). The user devices 102 may be televisions, tablet computers, personal computers, electronic book readers, gaming consoles, set-top boxes, media players, in-vehicle entertainment systems, smartphones, servers, device control systems, and so forth. As used in this disclosure, letters in parenthesis such as "(D)" indicate an integer value.

The user devices 102(1), 102(2), . . . , 102(D) may couple to one or more networks (not shown). The networks may include public networks, private networks, or a combination thereof. The networks may include, but are not limited to personal area networks (PANs), local area networks (LANs), wide area networks (WANs), and so forth. The networks may communicate using Ethernet, Wi-Fi, Bluetooth, ZigBee, 3G, 4G, or other technologies.

In some implementations, the user devices 102(1), 102(2), . . . , 102(D) may include user interfaces 104(1), 104(2), . . . , 104(D). The user interface 104 may be configured to present content. The content may comprise movies, television series, digital versatile disc (DVD), user-uploaded videos, electronic books, music, audiobooks, podcasts, or a combination thereof. For example, when the user devices 102(1), 102(2) comprise a tablet, the user devices 102(1), 102(2) may be used to present the content which is provided by way of the network from a server 110.

The user devices 102(1), 102(2), . . . , 102(D) may be configured to receive user input 106(1), 106(2), . . . , 106(D). The user input 106(1) may be an interaction with the content, such as, an instruction to play and pause a first time interval of the content. The first time interval may include a first time index 00:03:12 (hours:minutes:seconds) associated with the playing of the content and a second time index 00:13:18 associated with the pausing of the content. In other implementations, the first time interval may include a first index and a second index. The first and second index may be based on a time index, frame index, chapter index, section index, and so forth. The user input 106(2) may be an interaction with the content, to play a second time interval of the content at a playback speed that is different from a default playback speed, such as, fast forwarding through a portion of the content. The second time interval may include a first time index 00:15:18 associated with the beginning of fast forwarding the content and a second time index 00:19:08 associated with the completion of fast forwarding the content. The user devices 102(1), 102(2), . . . , 102(D) may generate interaction data 108(1), 108(2), . . . , 108(D) indicative of the user input 106(1), 106(2), . . . , 106(D) and a time interval associated with the user input 106(1), 106(2), . . . , 106(D). The user input 106 indicative of an interaction with the content may include an instruction to play the content, pause the presentation of the content, fast forward a portion of the content, stop the presentation of the content, play the content at a playback speed that is different from a default playback speed, skip a portion of the content, increase the volume for at least a portion of the content, decrease the volume for at least a portion of the content, change the display resolution for a portion of the content, change the display mode for at least a portion of the content, and so forth.

For example, the content being presented to the user may be the movie "Burning Sage." The user device 102(1) may be configured to receive the user input 106(1) to pause the presentation of the content "Burning Sage." The user device 102(1) may generate the interaction data 108(1) indicative of the user input 106(1) to pause presentation of the content and send the interaction data 108(1) to the server 110. The interaction data 108(1) may also include data indicative of a first time interval associated with a span of time bracketed by time indices of 00:03:12 to 00:13:18. The first time index in the content may be 00:03:12 associated with a user input 106(1) to play the content and the second time index may be 00:13:18 associated with the user input 106(1) to pause the presentation of the content. The content viewed during the first time interval may be associated with an action scene in the movie "Burning Sage."

Continuing this example, the user device 102(2) may be configured to receive the user input 106(2) to fast forward through a second time interval of the content "Burning Sage." The second time interval may be associated with a span of time bracketed by time indices of 00:00:00 to 00:03:01, which may be associated with the opening credits of the movie. The second time interval may include a first time index 00:00:00 associated with a user input to begin fast forwarding through the opening credits and a second time index 00:03:01 associated with the user input 106(2) to stop the fast forwarding of the content and begin playing the content. The user device 102(2) may be configured to generate the interaction data 108(2) indicative of the user input 106(2) to fast forward through the opening credits of "Burning Sage" and send the interaction data 108(2) to the servers 110. In other implementations, the interaction data 108(1), 108(2), . . . , 108(D) may include data indicative of a content identifier, time stamp, a frame number, a chapter scene, and so forth. In yet other implementations, the interaction data 108(1), 108(2), . . . , 108(D) may include data indicative of user account settings, current location of the user devices 102(1), 102(2), . . . , 102(D), country associated with a user account or the user devices 102(1), 102(2), . . . , 102(D), and so forth.

In other implementations, the user interfaces 104(1), 104(2), . . . , 104(D) may be configured to enable a user to input notes, comments, or other information associated with the user input 106(1), 106(2), . . . , 106(D). For example, the content being presented to the user may be a playback of a recorded video game session. In this example, the user devices 102(1), 102(2), . . . , 102(D) may be configured to receive the user input 106(1), 106(2), . . . , 106(D) to fast forward through a second time interval of the content. The second time interval may be associated with a span of time bracketed by time indices of 00:12:04 to 00:15:01, which may be associated with a first strategy for playing the game. The user input 106(1), 106(2), . . . , 106(D) may include notes or commentary from the user indicating the first strategy, thought process at that particular time interval, other potential strategies, and so forth. Continuing this example, the user input 106(1), 106(2), . . . , 106(D) may include notes or comments provided from the opponent or viewers of the recorded video game session.

In some implementations, the user interfaces 104(1), 104(2), . . . , 104(D) may be configured to enable a user or content creator to input notes or comments associated with the user input 106(1), 106(2), . . . , 106(D). For example, the user interfaces 104(1), 104(2), . . . , 104(D) may be configured to display an indicator, as described in more detail below, that indicates that a particular time interval associated with a span of time bracketed by time indices 01:04:04 to 01:17:01 is skipped. In this example, the user devices 102(1), 102(2), . . . , 102(D) may be configured to receive a note or comment from the content creator or the user explaining why users should view the content between time indices 01:04:04 to 01:17:01. The note or comment may provide information that the particular scene between the time indices 01:04:04 to 01:17:01 provides crucial information for later scenes in the content.

The servers 110 may include interest determination module(s) 112, user interface generator module(s) 114, content module(s) 116, and so forth. In one implementation, the interest determination module 112 may be configured to collect the interaction data 108(1), 108(2), . . . , 108(D) indicative of the user input 106(1), 106(2), . . . , 106(D) and data indicative of a time interval associated with the user input 106(1), 106(2), . . . , 106(D). The interest determination module 112 may be configured to send the interaction data 108(1), 108(2), . . . , 108(D) to the user interface generator module 114. In other implementations, the user interface generator module 114 may send a request to the interest determination module 112 to send the interaction data 108(1), 108(2), . . . , 108(D) associated with the content.

The user interface generator module 114 may be configured to generate first user interface data configured to cause depiction of a graphic representation of a line or playback indicator that is representative of the content and a graphic representation of a pointer configured to depict a relative position in the content as a position on the line or the playback indicator. The playback indicator may comprise an overlay to a portion of the user interfaces 104(1), 104(2), . . . , 104(D). The playback indicator may include a progress pointer configured to depict a relative position in the content, which the user is currently at or viewing. The playback indicator may also include a time indicator, time based playback indicator, or duration of time associated with the content. For example, the run time for the movie "Burning Sage" may be the total time index 02:00:00. The time indicator may depict a time index associated with the progress pointer indicating the relative position in the content, which the user is currently at. For example, the time index associated with the progress pointer may be 00:30:00 and the total time index of the movie may be 02:00:00. In this example, the playback indicator may depict the time index and the total time index together as 00:30:00/02:00:00.

The user interface generator module 114 may be configured to generate second user interface data 118 configured to cause a depiction of a second user interface element comprising an overlay to the line or the playback indicator. The overlay may be the second user interface element being presented a greater layer along a Z-axis relative to a layer used to present the content and the graphic representation of the line or the playback indicator, thus appearing to be on top of the presentation. In other implementations, the overlay may be above or below the graphic representation of the line or the playback indicator. In this implementation, the second user interface element 118 may be presented at the same layer along the Z-axis relative to the layer used to present the graphic representation of the line or the playback indicator, thus appearing to be next to, above, or below the graphic representation of the line or the playback indicator. The overlay may be configured to depict visual indicators that correspond to a portion of the line or the playback indicator associated with a time interval or a span of time indices. For example, the user input 106(1) associated with the first time interval may have a visual indicator of the color green. The color green indicates that most users have viewed the content associated with the first time interval. The user input 106(2) associated with the second time interval may have a visual indicator of the color yellow. The color yellow indicates that most users have fast forwarded the content associated with the second time interval. The indicators may include audio representation, haptic representation, and so forth.

In other implementations, the user interface generator module 114 may be configured to generate user interface data to represent, during playback of the content, the interest portion associated with the first or second time interval. For example, the user interface data 118 to represent the interest portion associated with the first or second time interval may be an audio representation. During playback of the content the audio representation associated with the first time interval may be the sound of a light breeze. The sound of a light breeze during playback may indicate that most users have viewed or listened to the content associated with the first time interval. Continuing the example, during playback of the content the audio representation associated with the second time interval may be the sound of the ocean. The sound of the ocean may indicate that most users have fast forwarded through the second time interval.

In another implementation, the user interface generator module 114 may be configured to generate second user interface data 118 configured to cause a depiction of a second user interface element 126 comprising a graphical element. The graphical element may be the second user interface element 126 being presented on the user device 120. For example, the graphical element may be located in a corner of a display device associated with the user device 120. During playback of the content, the graphical element may indicate to a user that other users for particular portions of the content have played the content, paused the content, fast forwarded the content, skipped the content, adjusted the volume of the content, changed the display mode of the content, and so forth.

In other implementations, the user interface generator module 114 may be configured to generate the second user interface data 118 configured to enable the user to move a graphical element or the playback indicator. For example, the user may be able to drag and drop the graphical element at a location within the display of the user interface 104.

The user interface generator module 114 may also be configured to generate the second user interface data 118 to be arranged around an outer border of the user interface 124. In this implementation, the outer border may indicate to a user that other users for particular portions of the content have played the content, paused the content, fast forwarded the content, skipped the content, adjusted the volume of the content, changed the display mode of the content, and so forth.

The user interface generator module 114 may be configured to generate the second user interface data 118 to include one or more buttons. The one or more buttons may be configured to be displayed on the user interface 124 to enable a user input 106, such as, to play the content, pause the content, fast forward the content, skip the content, adjust the volume of the content, change the display mode of the content, and so forth. The one or more buttons may correspond to a particular time interval. For example, the particular time interval may have an indicator which indicates that previous users have skipped the portion of the content associated with the particular time interval. In this example, the button that may be displayed on the user interface 124 may enable the user to skip that portion of the content.

The user interface generator module 114 may be configured to generate user interface data 118 which includes the first user interface data and the second user interface data. The user interface generator module 114 may send the user interface data 118 to a user device 120 upon notification that the user device 120 has requested content 122. The user devices 120 and 102 may use the same or different hardware, operating systems, applications, and so forth. The actions described in this disclosure may be performed using one or more of the user devices 102 or 120. Specific user devices and their respective resources are cited within a given example for purposes of clarity and generally without limitation.

In another implementation, the user interface generator module 114 may store the user interface data 118. In other implementations, the user interface generator module 114 may send the user interface data 118 to the content module 116 or upon receipt of a request from the content module 116 send the interface data 118 to the content module 116.

In other implementations, the user interface generator module 114 may determine a number of interactions with the content associated with a time interval within the content. For example, the user interface generator module 114 may determine that one hundred (100) users have fast forwarded the content between the first time index 00:00:00 and the second time index 00:03:01. The user interface generator module 114 may generate a user interface instruction configured to depict as an overlay on the presentation of the user interface element 126 the number of interactions with the content associated with the time interval within the content. For example, the user interface instruction may be configured to depict that one hundred (100) users have fast forwarded the content between the first time index 00:00:00 to the second time index 00:03:01. The overlay may be configured to depict the number of interactions when a position of a cursor is within the time interval associated with the first time index and the second time index.

The content module 116 may be configured to receive a request from the user device 120 for the content 122. The content module 116 may be configured to send the content 122 to the user device 120. The content module 116 may be further configured to send the user interface data 118 to the user device 120 or send a request to the user interface generator module 114 to send the user interface data 118 to the user device 120. In other implementations, the content module 116 may be configured to generate data which includes the content 122 and the user interface data 118. The content module 116 may send the data which includes the content and the user interface data 118 to the user device 120.

In another implementation, the request from the user device 120 for the content 122 may include a request for a particular user interface data 118 for a user selected time period. For example, the request may be for the user interface data 118 associated with user interactions from the past thirty (30) days. The content module 116 may be configured to access a datastore that includes one or more user interface data 118 associated with a user selected time period. The content module 116 may select the user interface data 118 associated with the user selected time period and send the user interface data 118 and the content 122 to the user device 120.

In other implementations, the user interface generator module 114 may be configured to access the datastore and select the user interface data 118 associated with the user selected time period. The user interface generator module 114 may either send the user interface data 118 associated with the user selected time period to the user device 120 or the content module 116.

The user device 120 may be configured to include a user interface 124 configured to present the content 122 and user interface element 126. The user interface element 126 may be configured to depict a presentation control 128 and one or more indicators, such as a first interest portion indicator 130, second interest portion indicator 132, and third interest portion indicator 134. The presentation control 128 may be configured to enable a user to control the presentation of the content 122. For example, the presentation control 128 may enable a user to play the content 122, pause the content 122, fast forward the content 122, skip portions of the content 122, adjust the volume of the content 122, change the display mode of the content 122, and so forth. The first interest portion indicator 130 may be associated with a portion of the content 122 that most users skip. The second interest portion indicator 132 may be associated with a portion of the content 122 that most users fast forward or play the content 122 at a playback speed that is different from a default playback speed. The third interest portion indicator 134 may be associated with a portion of the content 122 that most users view.

For example, the user device 120 may present the movie "Burning Sage" and the time interval associated with the first interest portion indicator 130 may indicate that most users skip over that portion of the content 122. The portion of the content 122 that most users skip over may be the opening credits to the movie "Burning Sage." The time interval associated with the second interest portion indicator 132 may indicate that most users fast forward that portion of the content 122. The portion of the content 122 that most users fast forward through may be a scene where the main characters of the movie are traveling from one town to another or may be a scene that does not include a lot of dialogue or substance to the plot of the movie. The time interval associated with the third interest portion indicator 134 may indicate that most users view that portion of the content 122. The portion of the content 122 that most users view may be an action scene or a scene that provides substance to the plot of the movie.

In other implementations, the first interest portion indicator 130, the second interest portion indicator 132, and the third interest portion indicator 134 may be associated with a portion of the content 122 which indicates that the user may increase the volume, decrease the volume, increase the display resolution, decrease the display resolution, change the display mode of the content 122, and so forth. For example, the time interval associated with the first interest portion indicator 130 may indicate to increase the volume as the audio presented during the time interval may be quiet or the characters are speaking softly. In this example, the time interval associated with the third interest portion indicator 134 may indicate to change the display mode of the content 122 to full screen as that portion of the content 122 may have an action scene which may be more enjoyable to view in a full screen display mode. Continuing this example, the time interval associated with the second interest portion indicator 132 may indicate to change the screen resolution to a lower resolution as most users fast forward through that portion of the content 122. By lowering the resolution, the user device 120 may reduce processor requirements, network bandwidth, memory allocation, and so forth.

In another implementation, the user device 120 may request the user interface data 118 based on the interaction data 108 for a particular country. For example, the request may be for the user interface data 118 from India. In this example, the user interface data 118 may be configured to include visual indicators. For example, the visual indicator of the color green indicates that most users have skipped the content associated with a particular time interval. The visual indicator of the color yellow indicates that most users have fast forwarded the content associated with another particular time interval. The visual indicator of the color red indicates that most users have viewed the content associated with yet another particular time interval. In other implementations, the user interface data 118 may be requested that is based on other interaction data 108, such as time of day, social network, place of work, and so forth.

In another implementation, the user device 120 upon receipt of the user interface data 118 may be configured to execute an interaction to omit display of a portion of the content 122 from a first time index to a second time index of a first time interval. For example, the first time interval may be associated with the first interest portion indicator 130. The first interest portion indicator 130 may indicate that most users skip the portion of the content 122 that extends from the first time index 00:00:00 to the second time index 00:01:53. In this example, upon playback of the content 122 the user device 120 begins playback at 00:01:53, omitting the displaying of the content 122 from 00:00:00 to 00:01:53.

In yet another implementation, the user device 120 upon receipt of the user interface data 118 may be configured to remove portions of the content 122 having a time interval associated with interest portions indicative of a number of views for the interest portions that are below a threshold value which indicates that users have viewed the portions of the content 122 having a time interval associated with the interest portions. For example, the threshold value which indicates that users have viewed a time interval that extends from the first time index 00:00:00 to the second time index 00:01:53 may be two hundred (200) views. In this example, the number of views may be ten (10). The time interval that extends from the first time index 00:00:00 to the second time index 00:01:53 may be associated with the first interest portion indicator 130. The first interest portion indicator 130 may indicate that most users skip the portion of the content 122 that extends from the first time index 00:00:00 to the second time index 00:01:53. In this example, upon playback of the content 122 the user device 120 removes the content 122 between the time indices 00:00:00 to 00:01:53.

In some implementations, the user device 120 may receive one or more particular portions of the content 122.

For example, the user device 120 may receive the portions of the content 122 that have time intervals associated with interest portions indicative of the third interest portion indicator 134, while other portions are not transmitted. Continuing the example, the time intervals associated with the third interest portion indicators 134 may have a span of time bracketed by time indices of 00:03:12 to 00:27:09, 0:33:12 to 00:57:19, 01:03:12 to 01:27:09, and so forth. In this example, the user device 120 may begin playback of the content 122 at the time index 00:03:12. This example may reduce the amount network bandwidth.

In other implementations, the user device 120 upon receipt of the user interface data 118 may be configured to begin playback of the content 122 at the time interval associated with an interest portion indicative of the third interest portion indicator 134. For example, the time interval associated with the third interest portion indicator 134 may have a span of time bracketed by time indices of 01:03:12 to 01:27:09. In this example, the user device 120 may begin playback of the content 122 at the time index 01:03:12.

In yet other implementations, the user devices 102(1), 102(2), . . . , 102(D) and the user device 120 may be configured to generate the user interface data 118. In this implementation, the user device 102 may be configured to retain the interaction data 108 and store the interaction data 108 on the user device 102. The interaction data 108 may be indicative of the user input 106 associated with the user device 102, the user devices 102 within a shared network, the user devices 102 within a social network and so forth. For example, the interaction data 108 may be indicative of the user input 106 associated with the user devices 102 within a shared network. In this example, the shared network may be a company network or a home network. The home network may include one or more user devices 102 with each device associated with a family member. The user device 102 may be configured to generate the user interface data 118, as described above. The user device 102 or the user device 120 may, upon playback of the content 122, select user interface data 118 associated with a particular user device 102 or a particular user within the shared network.

The user interface data 118 may be generated using interaction data 108 indicative of user inputs 106 from user devices 102 associated with users within a social network. The social network may include coworkers, friends, family, and so forth. For example, the interaction data 108 used to generate the user interface data 118 may be indicative of playback of the content 122 by friends and family who are within the social network of a user. In this way, a user may see which portions of the content 122 were of interest to those friends.

Figure 2:
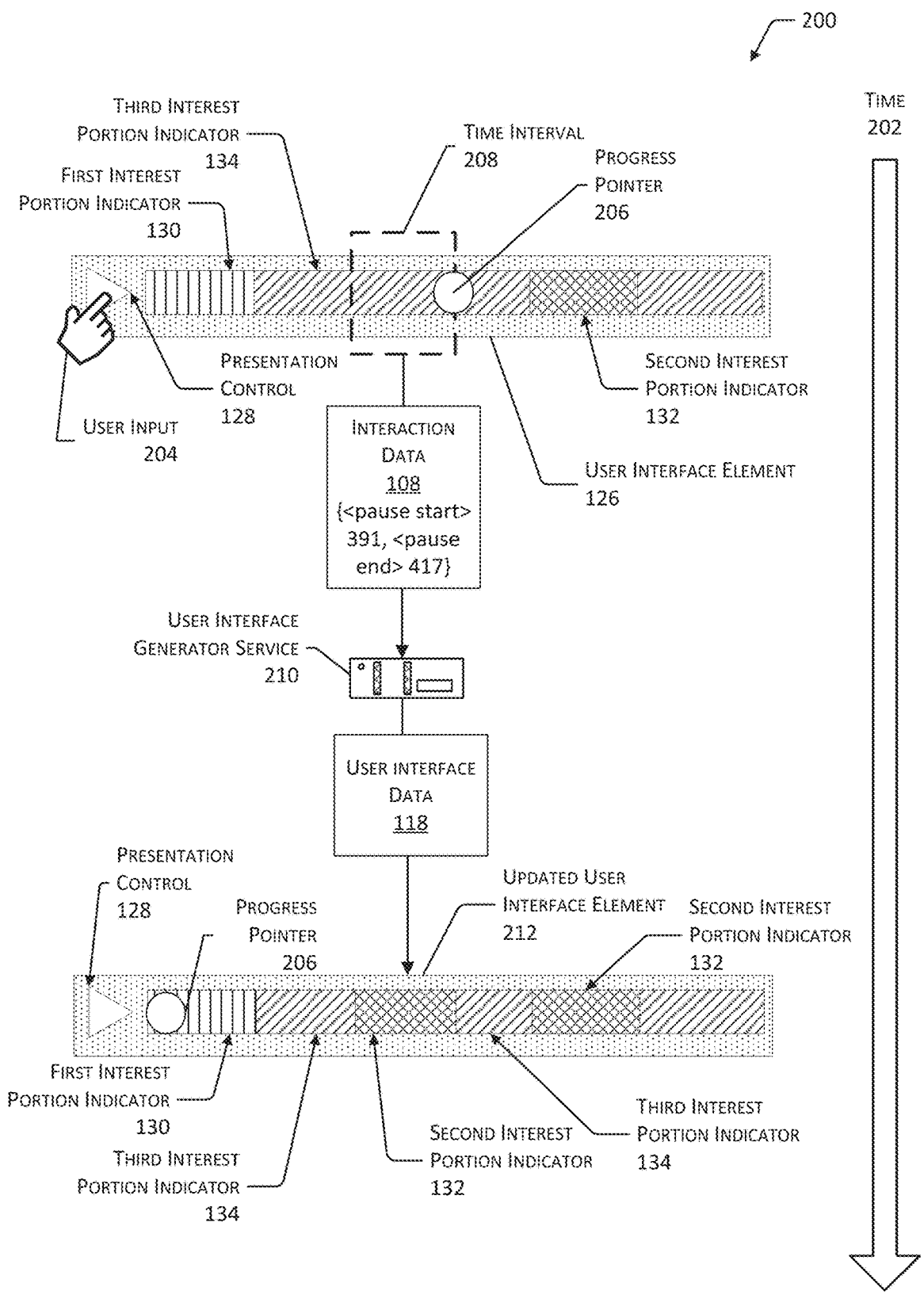
FIG. 2 is an example of a user interface element for receiving user input and generating an updated user interface element for the content.

FIG. 2 is an example 200 of the user interface element 126 for receiving user input and generating the updated user interface element 126 for the content 122. In this example, time 202 increases down the page as indicated by arrow. The user interface element 126 may include the presentation control 128 configured to receive a user input 204. The user input 204 may be a user instruction to play the content 122, pause the content 122, fast forward the content 122, skip portions of the content 122, adjust the volume of the content 122, change the display mode of the content 122, and so forth. The user interface element 126 may be configured to depict or include the first interest portion indicator 130, the second interest portion indicator 132, and the third interest portion indicator 134, as described above.

The first interest portion indicator 130 may be associated with a portion of the content 122 that most users skip. The second interest portion indicator 132 may be associated with a portion of the content 122 that most users fast forward or play the content 122 at a playback speed that is different from a default playback speed. The third interest portion indicator 134 may be associated with a portion of the content 122 that most users view.

The user interface element 126 may be configured to include a progress pointer 206. The progress pointer 206 may indicate a relative position in the content 122, which the user is currently at or viewing. For example, the user may be watching the movie "Burning Sage" and the progress pointer 206 may indicate that the user is currently at time index 01:10:05 of the movie.

The user interface element 126 may receive a user input 204 to pause the presentation of the content 122. One or more of the user device 102 or the user device 120 may be configured to indicate or determine a time interval 208. As mentioned above, the actions described may be performed using any of the user devices 102 or 120. For ease of illustration, user device 120 is used for the following description. However, it is understood that one or more of the following actions may be performed by the user device 102.

The time interval 208 may indicate a pause start of frame 391 and a pause end of frame 417. In other implementations, the time interval 208 may be associated with a span of time bracketed by time indices of 01:03:12 to 01:10:05. The time index 01:03:12 may be associated with a user input 204 to play the content 122 and the time index 01:10:05 may associated with the user input 204 to pause the presentation of the content 122. In other implementations, the time interval 208 may be associated with a span of frames bracketed by frame indices, chapters bracketed by chapter indices, sections bracketed by section indices, and so forth. The user device 120 may be configured to generate the interaction data 108, as described above, and send the interaction data 108 to a user interface generator service 210.

The user interface generator service 210 may include the user interface generator module 114, as described above. The user interface generator service 210 may be configured to generate first user interface data 118 configured to cause depiction of a graphic representation of a line or playback indicator that is representative of the content 122 and a graphic representation of a pointer configured to depict a relative position in the content 122 as a position on the line, as described above. In another implementation, the user interface generator service 210 may access data indicative of information about the time or frames associated with the content 122. The user interface generator service 210 may access the server 110, the content module 116, or another service to determine the time or frames of the content 122. In another implementation, the user interface generator service 210 may send a request to the server 110, the content module 116, or another service for information about the time or frames associated with the content 122.

The user interface generator service 210 may be configured to generate second user interface data 118 configured to cause a depiction of an updated user interface element 212 comprising an overlay to the line or the playback indicator, as described above. The overlay may be configured to depict visual indicators that correspond to a portion of the line associated with a time interval, as described above. In another implementation, the user interface generator service 210 may be configured to determine an indicator that corresponds to the interaction data 108 indicative of the user input 204. The indicator may be a visual indicator, an audio indicator, or a haptic indicator, as described above. The user interface generator 210 may, after determining the indicator, compare the time interval 208 associated with the determined indicator to the accessed data to determine where within the playback of the content 122 to include data indicative of the indicator. For example, the time interval may be associated with the span of time bracketed by time indices of 01:03:12 to 01:10:05. The time index 01:03:12 may be associated with a user input 204 to play the content 122 and the time index 01:10:05 may associated with the user input 204 to pause the presentation of the content 122. The user interface generator service 210 may generate data indicative of the indicator that when the content is accessed to either depict a visual indicator such as the color green, which denotes that most users view this portion of the content 122 or provide an indictor during the playback of that portion of the content 122.

The updated user interface element 212 may depict the presentation control 128, the progress pointer 206, the first interest portion indicator 130, the second interest portion indicator 132, the third interest portion indicator 134, or a combination thereof, as described above.

In another implementation, the user interface generator service 210 may be configured to receive one or more interaction data 108 indicative of a second interaction with the content 122. The interaction data 108 may include data indicative of the span of time bracketed by time indices of 01:03:12 to 01:10:05 with respect to the content 122 in which the interactions occurred. In this implementation, the interactions that occurred during the time indices of 01:03:12 to 01:10:05 may be associated with a different indicator than currently being presented. For example, the current indicator being presented for the time indices of 01:03:12 to 01:10:05 may be the third interest portion indicator 134. However, recent interaction data 108 may indicate that most of the users are fast forwarding the content 122 between the time indices of 01:03:12 to 01:10:05 and that the indicator may be changed to the second interest portion indictor 132. The user interface generator service 210 may determine whether the interaction data 108 associated with the second interest portion indicator 132 causes a threshold number of total interaction data for the time indices of 01:03:12 to 01:10:05 to have been met or exceeded.

For example, the threshold number of total interactions may be one hundred (100) interactions. In this example, when the user interface generator service 210 determines that the threshold of one hundred (100) interactions have been met, then the user interface generator service 210 may be configured to generate an updated user interface element 212, as described above. Continuing this example, when the user interface generator service 210 determines that the threshold number of total interaction data has not been met or exceeded, the user interface generator service 210 may be configured to update a counter associated with at least a portion of the time indices of 01:03:12 to 01:10:05 until the counter meets or exceeds the threshold. The counter may include an ordered list of data arranged according to time intervals and interest portion indicators. Particular ones of the ordered list may have assigned a weight to be applied by the counter. For example, a particular user may be an authorized user or a celebrity and may be assigned a weight to be applied to the interaction data 108 associated with that particular user.

In another implementation, the user interface generator service 210 may be configured to receive the interaction data 108 associated with a particular user. The particular user may be an authorized user or a celebrity. The interaction data 108 may include data indicative of the span of time bracketed by time indices of 01:03:12 to 01:10:05 with respect to the content 122 in which the interactions occurred. In this implementation, the interactions that occurred during the time indices of 01:03:12 to 01:10:05 may be associated with a different indicator than currently being presented. For example, the current indicator being presented for the time indices of 01:03:12 to 01:10:05 may be the third interest portion indicator 134. However, the interaction data 108 associated with the particular user may indicate that the particular user fast forwarded the content 122 between the time indices of 01:03:12 to 01:10:05 and that the indicator may be changed to the second interest portion indictor 132. The user interface generator service 210 may be based on the interaction data 108 being associated with the particular user and generate an updated user interface element 212, as described above.

In other implementations, the user interface generator service 210 may be configured to receive the interaction data 108. The interaction data 108 may be indicative of an interaction to replay the content between the time indices of 00:03:12 to 00:10:05. The user interface generator service 210 may determine the interaction data 108 is indicative of replaying the content 122 and discard the interaction data 108.

Figure 3:
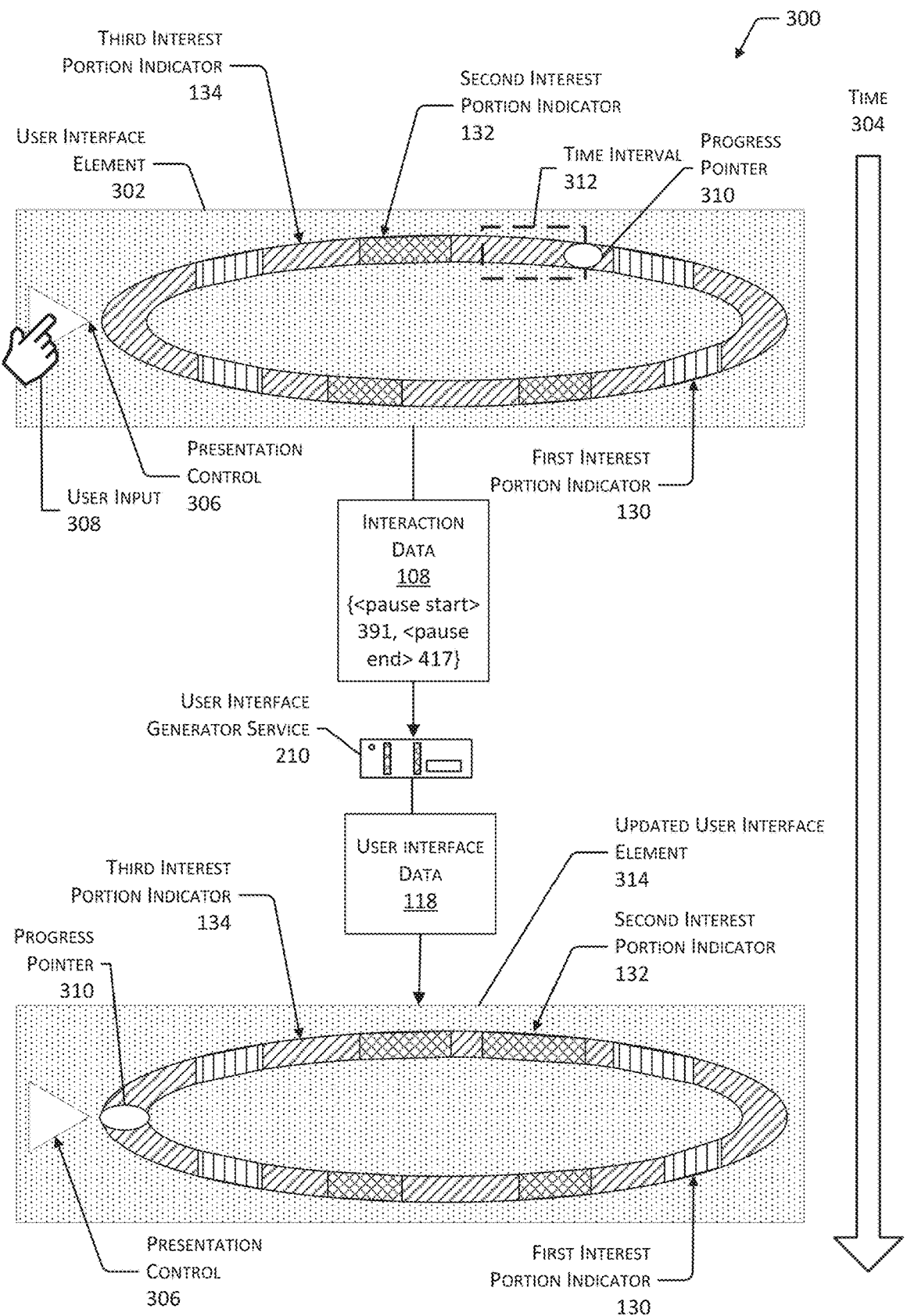
FIG. 3 is an example of a user interface element for receiving user input and generating an updated user interface element for the content.

FIG. 3 is an example 300 of a user interface element 302 for receiving user input and generating an updated user interface element for the content. In this example, time 304 increases down the page as indicated by the arrow. The user interface element 302 may include a presentation control 306 configured to receive a user input 308. The user input 308 may be a user instruction to play the content 122, pause the content 122, fast forward the content 122, skip portions of the content 122, adjust the volume of the content 122, change the display mode of the content 122, and so forth. The user interface element 302 may be configured to depict or include the first interest portion indicator 130, the second interest portion indicator 132, and the third interest portion indicator 134, as described above.

The first interest portion indicator 130 may be associated with a portion of the content 122 that most users skip. The second interest portion indicator 132 may be associated with a portion of the content 122 that most users fast forward or play the content 122 at a playback speed that is different from a default playback speed. The third interest portion indicator 134 may be associated with a portion of the content 122 that most users view.

The user interface element 302 may be configured to include a progress pointer 310. The progress pointer 310 may indicate a relative position in the content 122, which the user is currently at or viewing. For example, the user may be watching the movie "Burning Sage" and the progress pointer 310 may indicate that the user is currently at time index 00:45:00 of the movie.

The user interface element 302 may receive a user input 308 to pause the presentation of the content 122. The user device 102 or the user device 120 may be configured to indicate or determine a time interval 312. As mentioned above, the user devices 120 and 102 may use the same or different hardware, operating systems, applications, and so forth. The actions may be performed using one or more of the user devices 102 or 120. Specific user devices and their respective resources are cited within a given example for purposes of clarity and generally without limitation.

The time interval 312 may indicate a pause start of frame 391 and a pause end of frame 417. In other implementations, the time interval 312 may indicate a first time index of 00:30:00 associated with a user input 308 to play the content 122 and a second time index of 00:45:00 associated with the user input 308 to pause the presentation of the content 122. In other implementations, the time interval 312 may include a first index and a second index. The first index and second index may be based on time index, frame index, chapter index, section index, and so forth. The user device 120 may be configured to generate the interaction data 108, as described above, and send the interaction data 108 to a user interface generator service 210.

The user interface generator service 210 may generate the user interface data 118, as described above. The user interface generator service 210 may send the user interface data 118 to the user device 120, as described above. The user device 120, may be configured to include an updated user interface element 314. The updated user interface element 314 may be configured to depict the presentation control 306, the progress pointer 310, the first interest portion indicator 130, the second interest portion indicator 132, the third interest portion indicator 134, or a combination thereof, as described above.

FIGS. 4, 5, 6, and 7 depict a flow diagram illustrating a process 400 of receiving user input 106, 204, and 308 indicative of an interaction with content and generating a heat map user interface for content. Although the process 400 is described with reference to the flowchart illustrated in FIGS. 4, 5, 6, and 7, many other methods of performing the acts associated with the process 400 may be used. For example, the order of the steps may be changed, some of the steps described may be optional, and additional steps may be included. In these diagrams, time increases from top to bottom, such that events occurring at the bottom of the page may occur later than those events depicted at the top of the page.

At 402, the user device 102(1) may generate interaction data 108(1) indicative of an interaction with content. The content may comprise movies, television series, digital versatile disc (DVD), user-uploaded videos, electronic books, music, audiobooks, podcasts, or a combination thereof. The user device 102(1) may be a desktop computer, a tablet computer, a wearable computer, an e-book reader, a media device, a cellular phone, a smartphone, a laptop computer, and so forth.

The user device 102(1) may be configured to receive the user input 106(1), which may be an interaction with the content, such as an instruction to play and pause a first time interval of content. The first time interval may include the first time index 00:03:12 associated with the playing of the content and the second time index 00:13:18 associated with the pausing of the content. In other implementations, other indexes may be used instead of or in addition to a time index, such as a frame number, chapter number, scene number, and so forth. For example, instead of a time index, the first time interval may extend from a first frame number to a second frame number. The user device 102(1) may generate the interaction data 108(1) the user input 106(1) and the time interval associated with the user input 106(1). For example, the content being presented to the user may be the movie "Burning Sage." The user device 102(1) may be configured to receive the user input 106(1) to pause the presentation of the content "Burning Sage." The user device 102(1) may generate the interaction data 108(1) indicative of the user input 106(1) to pause presentation of the content and the first time interval which indicates a first time indicating the playing of the content and the second time indicating the pausing of presentation of the content, as described above. The user input 106(1) may be indicative of other interactions, as described above. The user device 102(1) may be configured to send the interaction data 108(1) to the interest determination service 406.

In another implementation, the user device 102(1) may include a camera. The camera may be configured to capture user interest associated with the content 122. For example, the camera may capture an image of the face of the user that may be processed to determine a nature of the expression. In this example, during an interaction the user may roll their eyes during a time interval. The time interval may include a first time index 00:15:18 associated with the beginning of the user rolling their eyes and a second index 00:15:23 associated with the stopping of the user rolling their eyes. The user device 102(1) may be configured to send the interaction data 108(1) indicative of the interaction of a user rolling their eyes to the interest determination service 406. In other examples, the camera may capture an image of the face of the user that may be processed to determine a nature of the expression. For example, during an interaction the user may present a bored look on their face for a particular time interval of the content 122, an excited expression or laugh on their face for another time interval of the content 122, and so forth. In this example, the user device 102(1) may be configured to send the interaction data 108(1) to the interest determination service 406.

In other implementations, the user device 102(1) may be configured to receive the user input 106(1), which may be an interaction with other software or applications on the user device 102(1) or another user device on the same network. For example, the content being presented to the user may be the movie "Burning Sage." The user device 102(1) may be configured to receive the user input 106(1) to access an electronic mail (e-mail) application and one or more inputs indicative of a selection to display an e-mail. The user input 106(1) of accessing the e-mail application may be a time interval associated with a span of time bracketed by time indices of 00:03:12 to 0:13:09. In this example, the user started accessing the e-mail application at around 00:03:12 and completed or ended accessing the e-mail application at around 00:13:09. In this example, the accessing of the e-mail application may be determined to be represented by the first interest portion indicator 130, as described above.

At 404, the user device 102(2) may generate interaction data 108(2) indicative of an interaction with content. The user device 102(2) may be a desktop computer, a tablet computer, a wearable computer, an e-book reader, a media device, a cellular phone, a smartphone, a laptop computer, and so forth.

The user device 102(2) may be configured to receive the user input 106(2), which may be an interaction with the content, such as an instruction to play a second time interval of the content at a playback speed that is different from a default playback speed, as described above. The playback speed may correspond to fast forwarding of the content. The second time interval may include a first time associated with the beginning to the fast forward of the content and a second time associated with the completion or stopping the fast forwarding of the content. For example, the content being presented to the user may be the movie "Burning Sage." The user device 102(2) may be configured to receive the user input 106(2) to fast forward the presentation of the content "Burning Sage." The user device 102(2) may generate the interaction data 108(2) indicative of the user input 106(2) to fast forward the presentation of the content and the second time interval may include a first time index 00:15:18 associated with the beginning of fast forwarding the content and a second time index 00:19:08 associated with the completion of fast forwarding the content, as described above. The user device 102(2) may be configured to send the interaction data 108(2) to the interest determination service 406.

At 408, the interest determination service 406 may be configured to generate aggregate data 410 to include the interaction data 108(1), 108(2), . . . , 108(D) indicative of an interaction with the content. The aggregate data 410 may include a collection of the user inputs 106(1), 106(2), . . . , 106(D) from multiple user devices, such as the user devices 102(1), 102(2), . . . , 102(D) and the user device 120, associated with the content. The interest determination service 406 may be configured to send the aggregate data 410 to the user interface generator service 210. In other implementations, the interest determination service 406 may receive a request from the user interface generator service 210 to send the aggregate data 410. In this implementation, the interest determination service 406 upon receipt of the request may send the aggregate data 410 to the user interface generator service 210.

Figure 4:
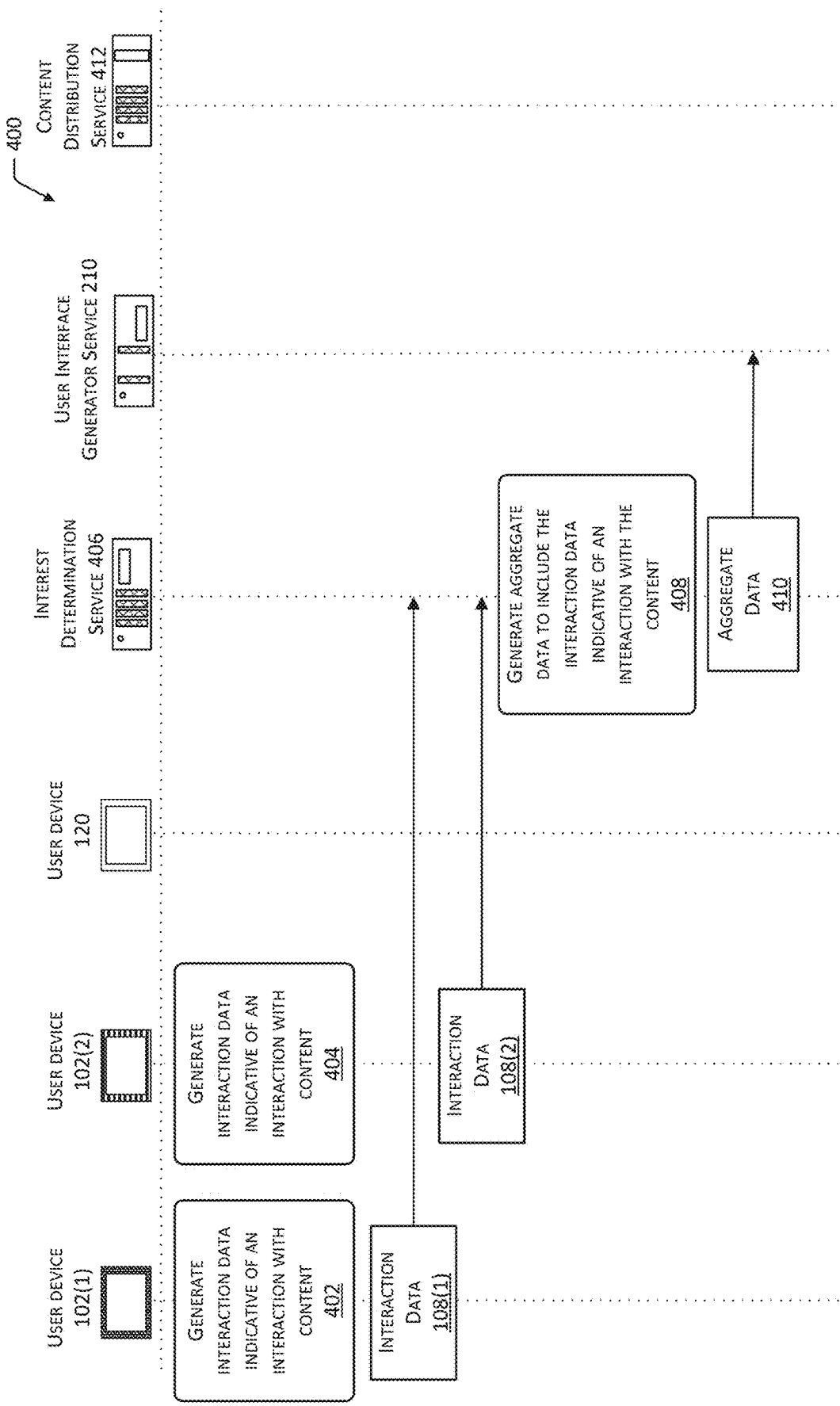
FIGS. 4, 5, 6, and 7 depict a flow diagram illustrating a process of receiving user input and generating user interface data to provide indicators associated with content.
Figure 5:
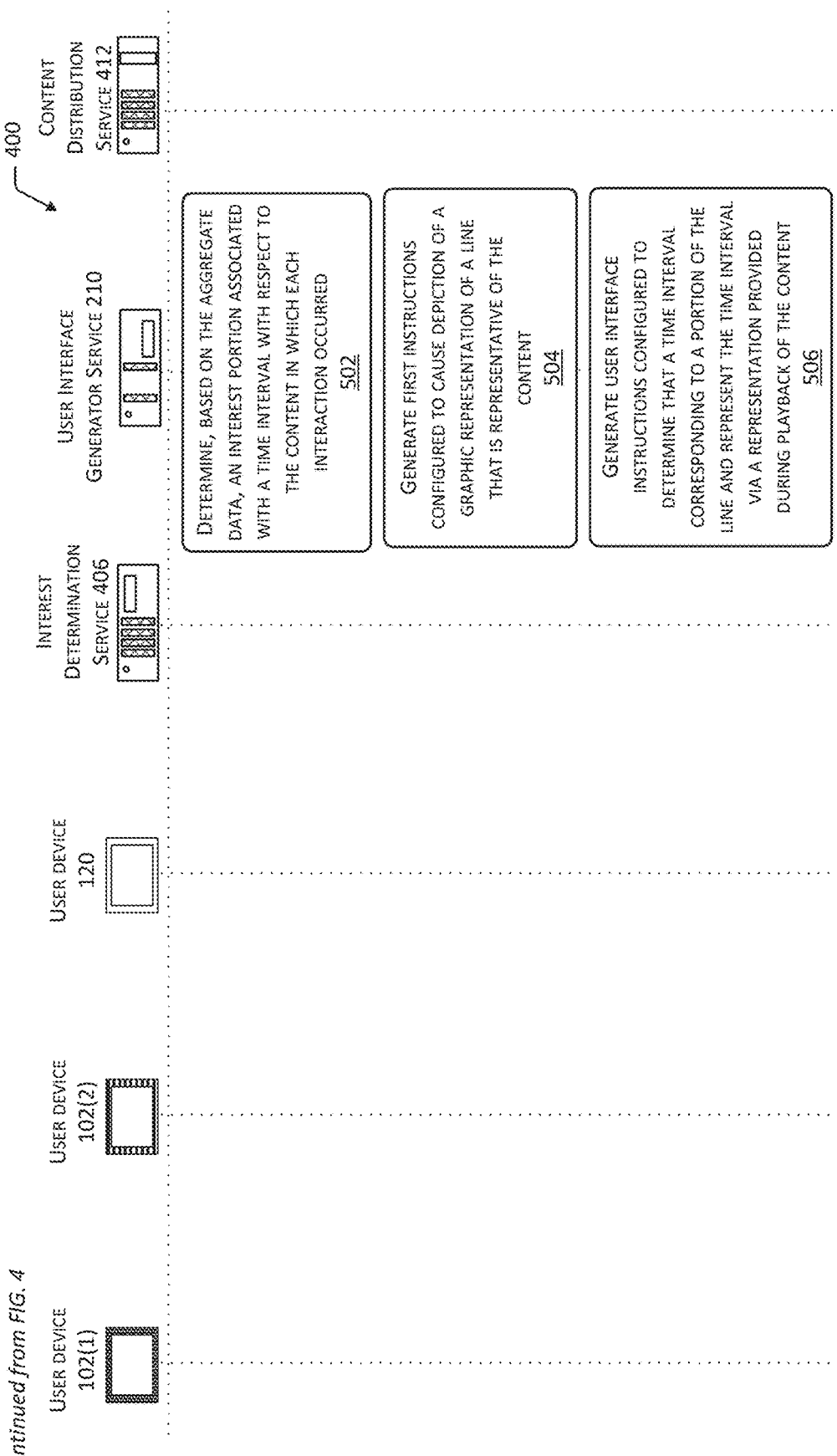

FIG. 5 depicts the continuation of the flow diagram of the process 400 from FIG. 4. At 502, the user interface generator service 210 may determine, based on the aggregate data 410, an interest portion associated with a time interval with respect to the content in which each interaction occurred. For example, the user may be watching the movie "Burning Sage" and the interaction with the content may be to fast forward through a portion of the movie associated with the time interval. The time interval may be associated with a span of time bracketed by time indices of 01:03:12 to 01:27:09. In this example, the user started fast forwarding at around 01:03:12 and completed or ended fast forwarding the movie at around 01:27:09. Continuing this example, the user interface generator service 210 may determine that the time interval may have an interest portion corresponding to the second interest portion indicator 132. The second interest portion indicator 132 may have a visual indicator of the color yellow, a pattern, or shade. The visual indicator denotes that most users have fast forwarded through the time interval or a time interval that includes the time interval associated with the span of the time bracketed by time indices of 01:03:12 to 01:27:09.

In other implementations, the second interest portion indicator 132 may have an indicator that includes the visual indicator, an audio representation, a haptic representation, or a combination thereof. For example, the user may be listening to a podcast and starts fast forwarding at around 00:20:12 and ends fast forwarding at around 00:22:31. The user interface generator service 210 may determine that the time interval may have an interest portion corresponding to the second interest portion indicator 132. The second interest portion indicator 132 may be an audio representation and that during a subsequent audio presentation of the podcast a user may hear the sounds of the ocean which indicates that most users have fast forwarded that time interval.

At 504, the user interface generator service 210 may be configured to generate first instructions configured to cause depiction of a graphic representation of a line that is representative of the content. The user interface generator service 210 may also be configured to generate a graphic representation of a pointer configured to depict a relative position in the content as a position on the line. For example, the graphic representation of the line may be a playback indicator. The playback indicator may include a progress pointer 206, 310 configured to depict a relative position in the content, which the user is currently at or viewing. The playback indicator may also include a time indicator duration of time associated with the content, a time index, and so forth. For example, the run time for the movie "Burning Sage" may be 02:00:00. The time indicator may depict 02:00:00 as the time associated with the content. The progress pointer 206, 310 may indicate the relative position in the content, which the user is currently at, for example, the user may be at time index 00:30:00 and the total time index for "Burning Sage" may be 02:00:000. The playback indicator may depict a graphical representation of 00:30:00/02:00:00.

In another implementation, the user interface generator service 210 may access data indicative of information about the time, time index, or frames associated with the content. The user interface generator service 210 may access the server 110, the content module 116, content distribution service 412, or another service to determine the time, the time index, or frames of the content. In another implementation, the user interface generator service 210 may send a request to the server 110, the content module 116, the content distribution service 412 or another service for information about the time, the time index, frames associated with the content, chapter indices associated with the content, and so forth. The user interface generator service 210 uses the information to determine where to place data indicative of the indicator which is associated with the interaction data 108(1), 108(2), . . . , 108(D).

At 506, the user interface generator service 210 may be configured to generate user interface instructions configured to determine a time interval corresponding to a portion of the line and represents the time interval via a representation provided during playback of the content. The user interface generator service 210 may be configured to determine an indicator that corresponds to the interaction data 108(1), 108(2), . . . , 108(D), indicative of the user input 106(1), 106(2), . . . , 106(D). The indicator may be a visual indicator, an audio indicator, or a haptic indicator, as described above. The user interface generator 210 may after determining the indicator, compare the time interval associated with the determined indicator to the accessed data to determine where within the content to include data indicative of the indicator. For example, the time interval associated with the indicator may be a span of time bracketed by time indices of 00:53:12 to 01:07:09, where time index 00:53:12 may be associated with the user input to play the content, and the time index 01:07:09 may be associated with the user input 106(1), 106(2), 106(D) to pause the presentation of the content. The user interface generator 210 may generate data indicative of the indicator so that when the content is accessed to either depict a visual indicator such as the color green, which denotes that most users view this portion of the content or provide another type indictor such as an audio indicator or a haptic indicator.

In another implementation, the user interface generator service 210 may be configured to generate second user interface data 118 configured to cause a depiction of a second user interface element 126 comprising an overlay to the line, as described above. The overlay may be configured to depict visual indicators that correspond to a portion of the line associated with a time interval, as described above.

In yet another implementation, the user interface generator service 210 may be configured to generate second user interface data 118 configured to cause a depiction of a second user interface element 126 comprising the graphical element, as described above. For example, the graphical element may be located in a corner of a display device associated with the user device 120. During playback of the content, the graphical element may indicate to a user that other users for particular portions of the content have played the content, paused the content, fast forwarded the content, skipped the content, adjusted the volume of the content, changed the display mode of the content, and so forth.

In other implementations, the user interface generator service 210 may be configured to generate the second user interface data 118 based on user account information, location information, device information, time of day information, or a combination thereof. The user accounting information may be associated with the user device 102 or the user device 120 of the user input 106. For example, the user accounting information may indicate that the user is a subscriber to a premium service or may have limited bandwidth. In this example, the user account information may indicate that the user has load bandwidth. The user interface generator service 210 may be configured to generate the second user interface data 118 to cause portions of the content 122 that have time intervals associated with interest portions indicative of a particular portion to be sent to the user device 120. The remaining portions of the content 122 may not be transmitted, may be transmitted at a low resolution, and so forth.

The location information of the user device 120 may indicate a particular country. For example, the user interface generator service 210 may generate the second user interface data 118 for a particular country associated with the user device or for all countries. In this example, the location information may indicate the country India. The second user interface data 118 may be configured to include visual indicators. For example, the visual indicator of the color green indicates that most users have skipped the content associated with a particular time interval. The visual indicator of the color yellow indicates that most users have fast forwarded the content associated with another particular time interval. The visual indicator of the color red indicates that most users have viewed the content associated with yet another particular time interval.

The device information may indicate the type of device the user is using. For example, the user may be using a smartphone. In this example, the user interface generator service 210 may generate the second user interface data 118 configured to be displayed on the smartphone. In addition, the user interface generator service 210 may generate indicators to indicate which portions of the content may require the user to change the orientation of the smartphone from landscape to portrait and vice versa.

The time of day information may indicate when the user input 106 occurred. For example, the user input 106 occurred at 9:00 am. The time of day information may also indicate when and what a user prefers to view. For example, a user at 9:00 am on a Monday may prefer to view comedy or funny scenes. In this example, the user interface generator service 210 may generate the second user interface data 118 configured to indicate which portions of the content are associated with funny scenes.

In some implementations, the user interface generator service 210 may be configured to generate the second user interface data 118 for presentation via an augmented reality (AR) device. In this implementation, when the user device 120 is not an AR device, the user device 120 may be configured to depict the content 122 and represent the playback indicator via a representation indicated by the content data and the second user interface data 118, as described above. For example, when the user device 120 is not an AR device, the user device 120 may be configured to include the user interface 124 configured to present the content 122 and the user interface element 126. The user interface element 126 may be configured to depict the presentation control 128 and one or more indicators, such as the first interest portion indicator 130, the second interest portion indicator 132, and the third interest portion indicator 134, as described above. In another example, when the user device 120 is an AR device, the user device 120 may be configured to remove the first interest portion indicators which indicate that most users skip the portion of the content 122. In this example, the first interest portion indicator 130 may extend from the first time index 00:00:00 to the second time index 00:01:53. Upon playback of the content 122 the user device 120 removes the content 122 between the time indices 00:00:00 to 00:01:53 and may begin playing at time index 00:01:54.

Figure 6:
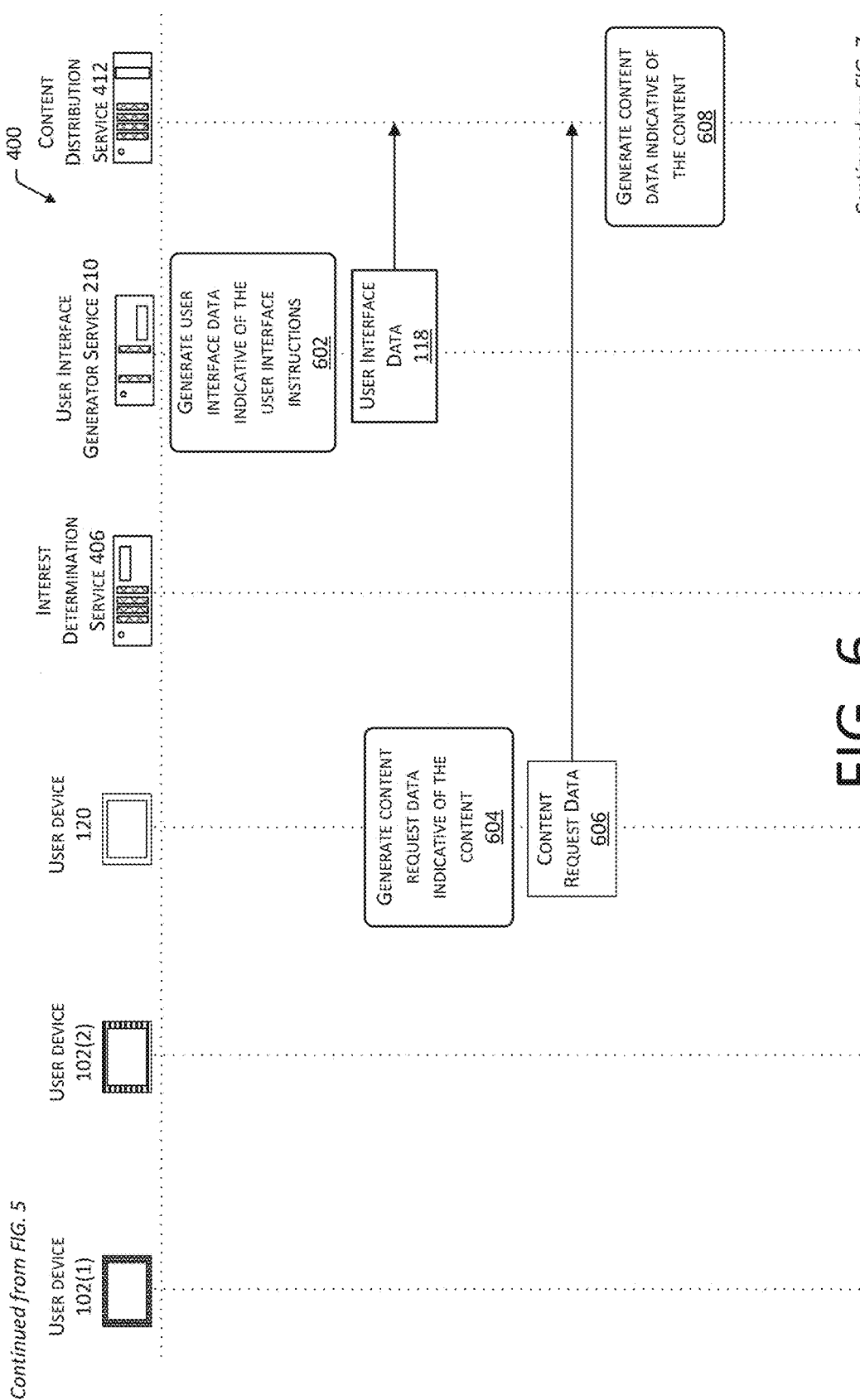

FIG. 6 depicts the continuation of the flow diagram of the process 400 from FIGS. 4 and 5. At 602, the user interface generator service 210 may generate the user interface data 118 indicative of the user interface instructions. The user interface generator service 210 may send the user interface data 118 to the content distribution service 412. In another implementation, the user interface generator service 210 may receive a request for the user interface data 118 from the content distribution service 412. In this implementation, the user interface generator service 210 upon receipt of the request may send the user interface data 118 to the content distribution service 412. In other implementations, the content distribution service 412 may send a request to the user interface generator service 210 to send the user interface data 118 to the user device 120. The user interface generator service 210 upon receipt of the request may be configured to send the user interaction data 118 to the user device 120.

In another implementation, the user interface generator service 210 may determine a number of interactions with the content associated with a time interval within the content. For example, the user interface generator service 210 may determine that one hundred (100) users have fast forwarded the content between the first time index 00:00:00 to the second time index 00:03:01. The user interface generator service 210 may generate user interface instructions configured to depict, as an overlay on the presentation of the user interface element 126, the number of interactions with the content associated with the time interval within the content. For example, the user interface instruction may be configured to depict that one hundred (100) users have fast forwarded the content between the first time index 00:00:00 to the second time index 00:03:01. The overlay may be configured to depict the number of interactions when a position of a cursor is within the time interval associated with the first time index and the second time index.

At 604, the user device 120 may be configured to generate content request data 606 indicative of the content 122. The content 122 may comprise movies, television series, digital versatile disc (DVD), user-uploaded videos, electronic books, music, audiobooks, podcasts, or a combination thereof. For example, the user device 120 may send a request for the movie "Burning Sage." The user device 120 may be configured to send the content request data 606 to the content distribution service 412.

In another implementation, the content request data 606 may include a request for a particular user interface data 118 for a user selected time period. For example, the request may be for the user interface data 118 associated with user interactions from two (2) years ago. The content distribution service 412 may be configured to access a datastore that includes one or more user interface data 118 associated with a user selected time period. The content distribution service 412 may select the user interface data 118 associated with the user selected time period and send the user interface data 118 and the content 122 to the user device 120.

In other implementations, the user interface generator service 210 may be configured to access the datastore and select the user interface data 118 associated with the user selected time period. The user interface generator service 210 may either send the user interface data 118 associated with the user selected time period to the user device 120 or the content distribution service 412.

At 608, the content distribution service 412 may be configured to generate content data 702 indicative of the content. For example, the content may be the movie "Burning Sage."

Figure 7:
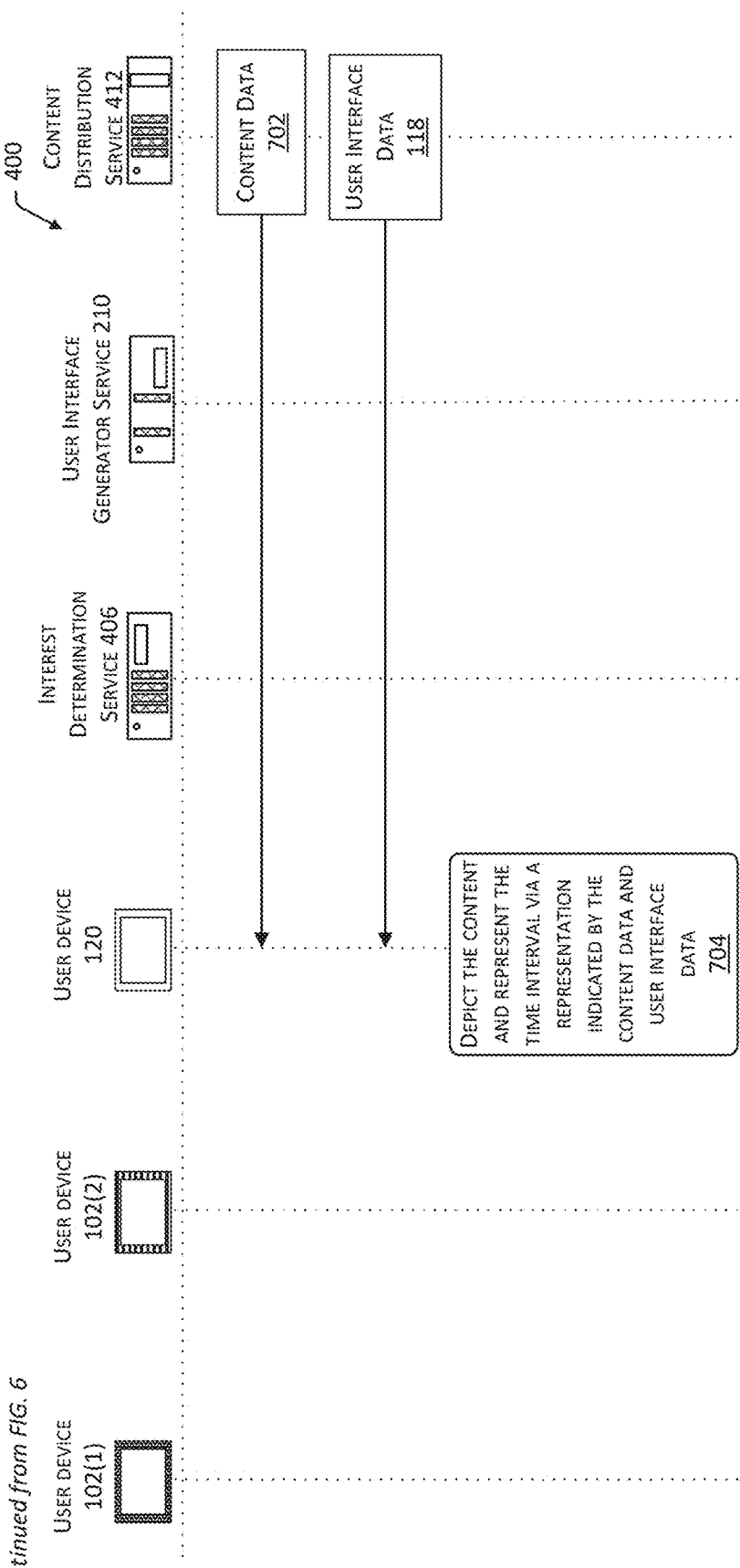

FIG. 7 depicts the continuation of the flow diagram of the process 400 from FIGS. 4, 5, and 6. The content distribution service 412 may be configured to send the content data 702 and the user interface data 118. In one implementation, the content distribution service 412 may send the content data 702 and the user interface data 118 together. In another implementation, the content distribution service 412 may send the content data 702 and the user interface data 118 separately. In other implementations, the content distribution service 412 may send the content data 702 to the user device 120 and send a request to the user interface generator service 210 to send the user interface data 118 to the user device 120.

At 704, the user device 120 may be configured to depict the content and represents the time interval via a representation indicated by the content data 702 and the user interface data 118. The user device 120 may be configured to include the user interface 124 configured to present the content 122 and the user interface element 126. The user interface element 126 may be configured to depict the presentation control 128 and one or more indicators, such as the first interest portion indicator 130, the second interest portion indicator 132, and the third interest portion indicator 134, as described above. The presentation control 128 may be configured to enable a user to control the presentation of the content 122, as described above. The first interest portion indicator 130 may be associated with a portion of the content 122 that most users skip, as described above. The second interest portion indicator 132 may be associated with a portion of the content 122 that most users fast forward or play the content 122 at a playback speed that is different from a default playback speed, as described above. The third interest portion indicator 134 may be associated with a portion of the content 122 that most users view, as described above.

In other implementations, the first interest portion indicator 130, the second interest portion indicator 132, and the third interest portion indicator 134 may be associated with a portion of the content which indicates that the user may increase the volume, decrease the volume, increase the display resolution, decrease the display resolution, change the display mode of the content, a number of interactions associated with the interest portion indicator, and so forth. For example, the time interval associated with the first interest portion indicator 130 may indicate to increase the volume as the audio presented during the time interval may be quiet.

In another implementation, the user device 120 may receive a portion of the content 122. In this implementation, the user device 120 may receive the portions of the content 122 that have time intervals associated with interest portions indicative of a particular portion. The remaining portions of the content 122 may not be transmitted, may be transmitted at a low resolution, and so forth. The portion sent to the user device 120 may be specified by the user, such as via a threshold control, system administrator, and so forth. For example, the time intervals associated with the third interest portion indicators 134 may have a span of time bracketed by time indices of 00:03:12 to 00:27:09, 0:33:12 to 00:57:19, 01:03:12 to 01:27:09, and so forth. In this example, the user device 120 may begin playback of the content 122 at the time index 00:03:12.

In yet another implementation, the user device 102(1), 102(2), . . . , 102(D) and the user device 120 may be configured to generate the user interface data 118, as described above. In this implementation, the user device 102 may be configured to retain the interaction data 108 and store the interaction data 108 on the user device 102. The interaction data 108 may be indicative of the user input 106 associated with the user device 102, the user devices 102 within a shared network, the user devices 102 within a social network, and so forth. For example, the interaction data 108 may be indicative of the user input 106 associated with the user devices 102 within a shared network. In this example, the shared network may be a company network or a home network. The home network may include one or more user devices 102 with each device associated with a family member. The user device 102 may be configured to generate the user interface data 118, as described above. The user device 102 or the user device 120 may upon playback of the content 122 select user interface data 118 associated with a particular user device 102 or a particular user within the shared network.

Figure 8:
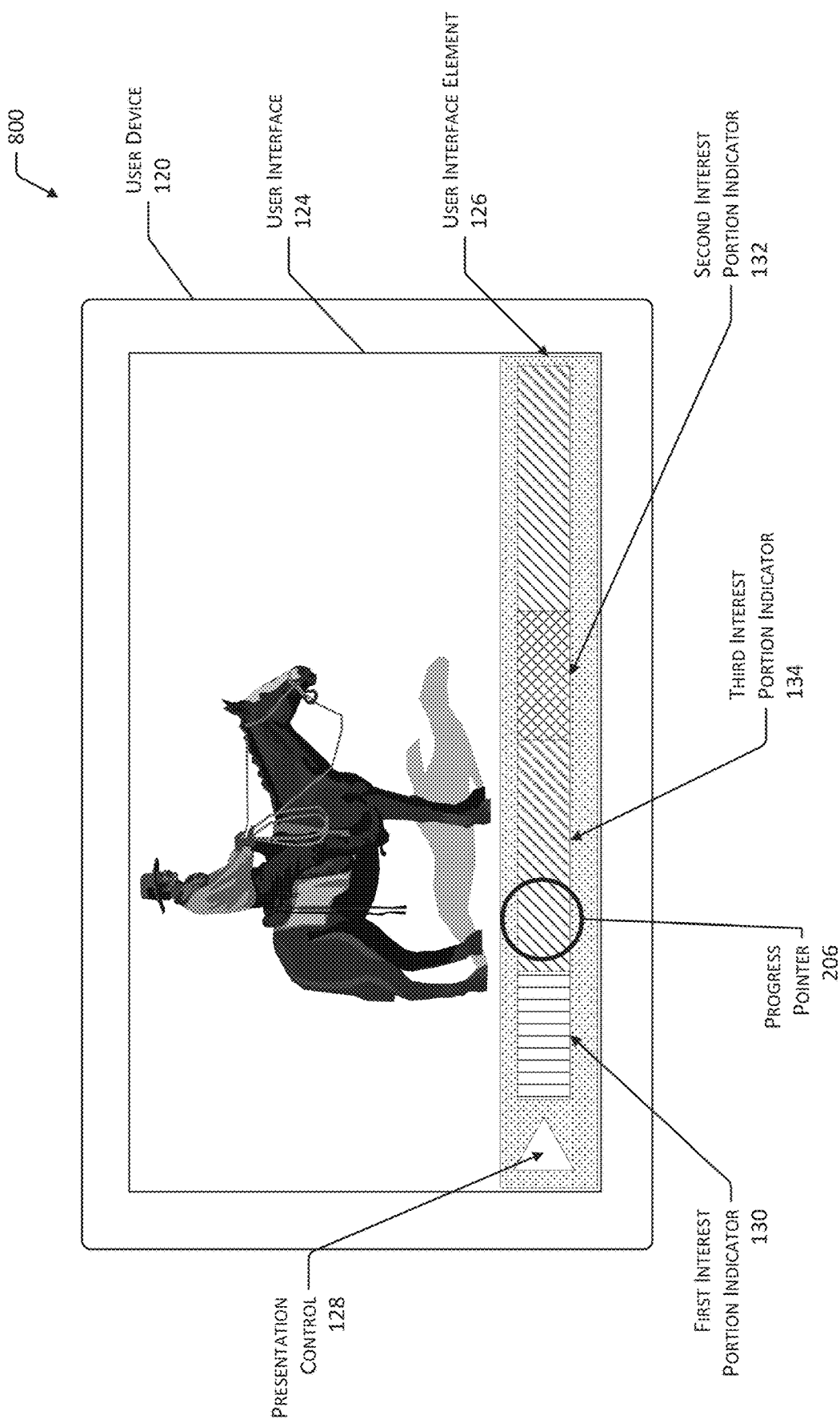
FIG. 8 depicts an example of a user interface to enable a user to view a user interface element.
Figure 12:
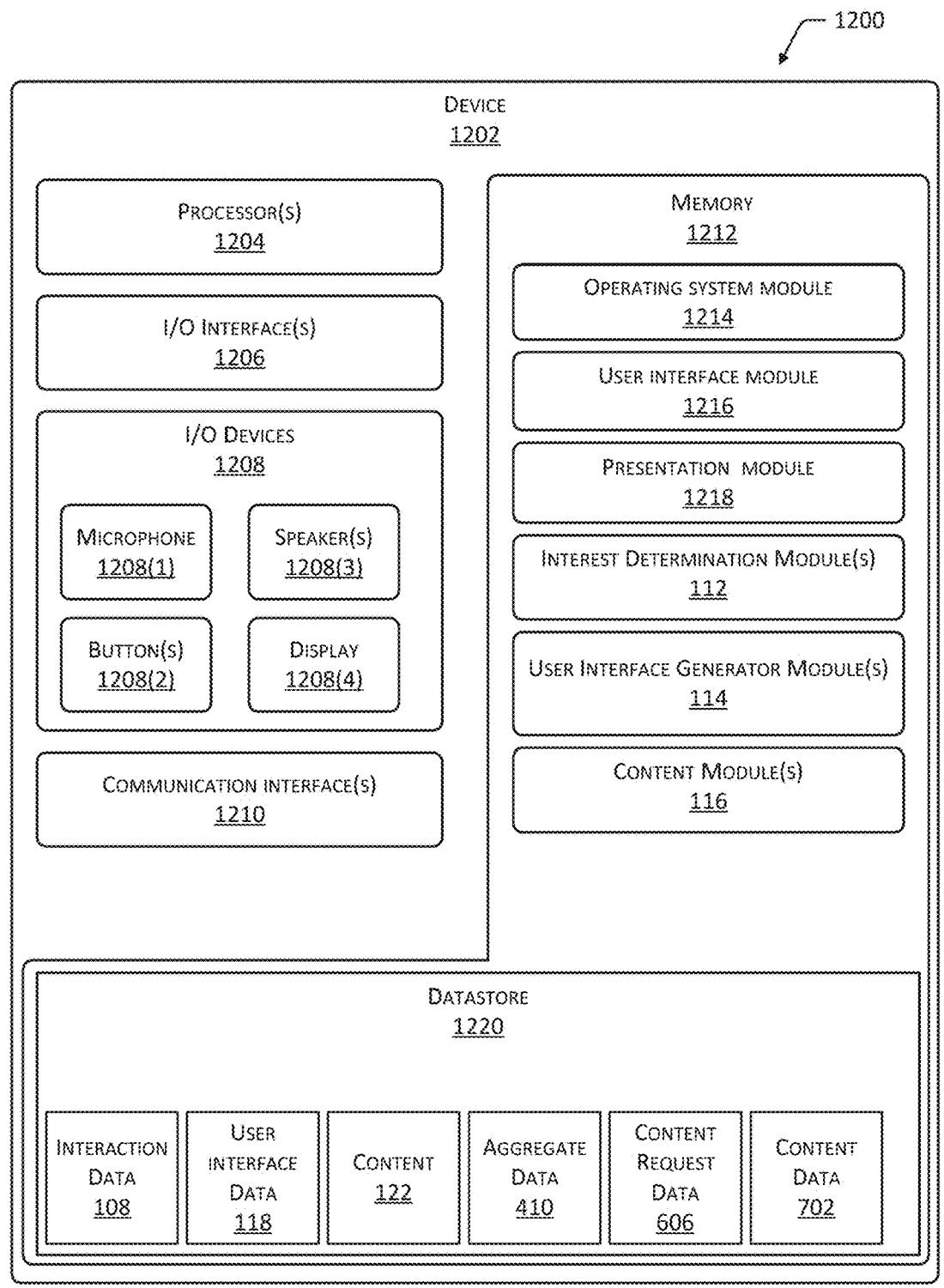
FIG. 12 illustrates a block diagram of a device to receive user input and generate user interface data to provide indicators associated with content.

FIG. 8 depicts an example 800 user interface 124 to enable a user to view a user interface element 126. In some implementations, the user interface 124 may be presented by a user interface module 1216 as illustrated in FIG. 12 or the user interface generator module 114 as illustrated in FIG. 1.

The user device 120 may be configured to have a user interface 124. The user interface 124 may depict the content 122. For example, the user interface 124 may depict the movie "Burning Sage." The user interface 124 may be configured to depict the user interface element 126 and may include the presentation control 128, the progress pointer 206, and one or more indicators, as described above. The presentation control 128 may be configured to enable a user to control the presentation of the content 122, as described above. For example, the presentation control 128 may enable a user to play the content, pause the content, fast forward the content, skip portions of the content, adjust the volume of the content, change the display mode of the content, and so forth. The one or more indicators may be the first interest portion indicator 130, the second interest portion indicator 132, or the third interest portion indicator 134, as described above. The progress pointer 206 may indicate the relative position in the content, which the user is currently at or viewing, as described above. For example, the user may be watching the movie "Burning Sage" and the progress pointer 206 may indicate that the user is currently at time index 00:33:05 of the movie.

Figure 9:
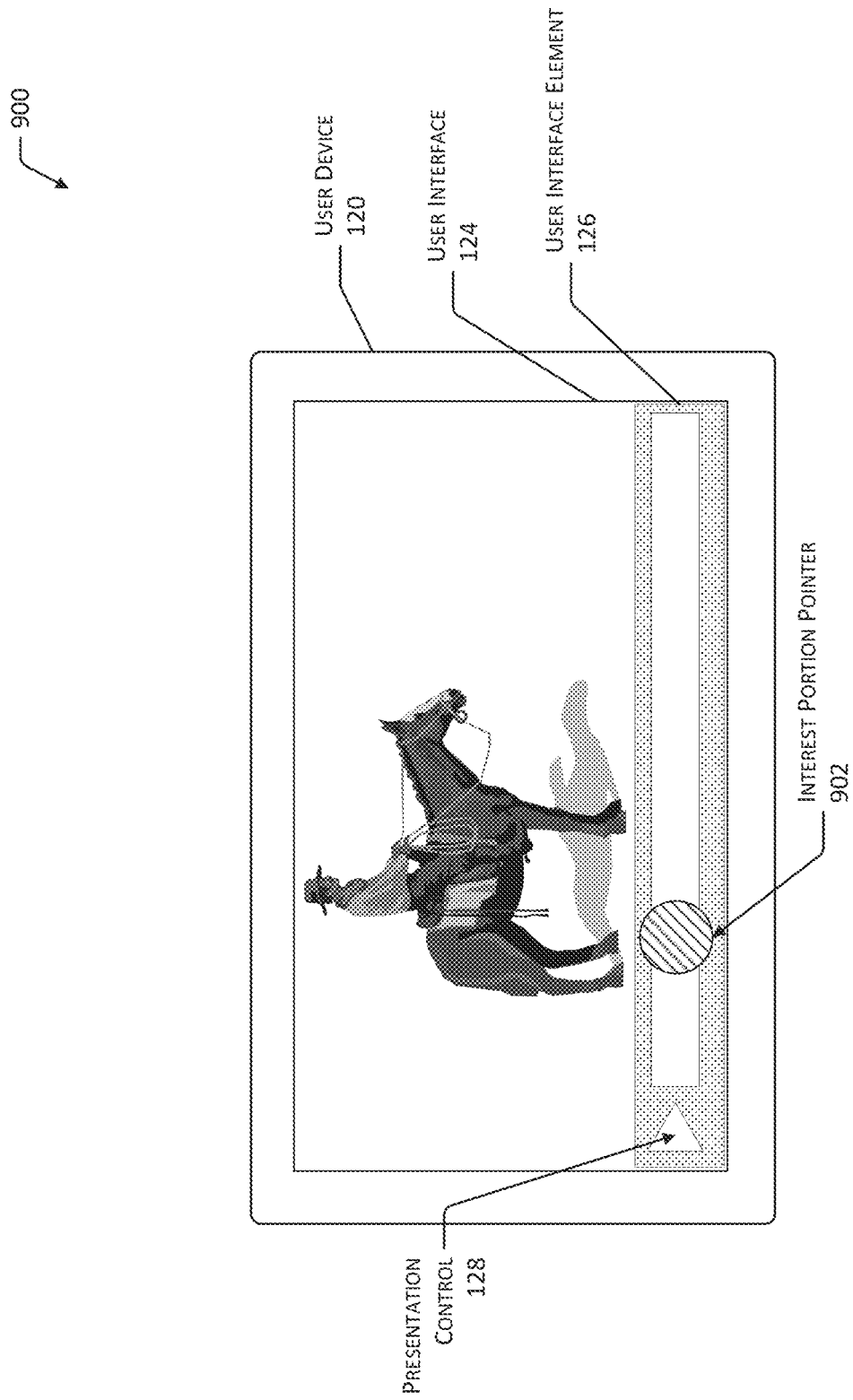
FIG. 9 depicts an example of a user interface to enable a user to view a user interface element.

FIG. 9 depicts an example 900 user interface to enable a user to view a user interface element 126. In some implementations, the user interface may be presented by the user interface module 1216 as illustrated in FIG. 12 or the user interface generator module 114 as illustrated in FIG. 1.

The user device 120 may be configured to have a user interface 124. The user interface 124 may depict the content 122. For example, the user interface 124 may depict the movie "Burning Sage." The user interface 124 may be configured to depict the user interface element 126 and may include the presentation control 128 and an interest progress pointer 902. The presentation control 128 may be configured to enable a user to control the presentation of the content 122, as described above. For example, the presentation control 128 may enable a user to play the content, pause the content, fast forward the content, skip portions of the content, adjust the volume of the content, change the display mode of the content, and so forth. The progress pointer 206 (not shown) may indicate the relative position in the content, which the user is currently at or viewing, as described above. For example, the user may be watching the movie "Burning Sage" and the progress pointer 206 may indicate that the user is currently at time index 00:33:05 of the movie. The interest progress pointer 902 may be configured to depict one or more indicators as the interest progress pointer 902 advances along while the content is being viewed. The one or more indicators that the interest progress pointer 902 may depict are the first interest portion indicator 130, the second interest portion indicator 132, or the third interest portion indicator 134.

The first interest portion indicator 130 may be associated with a portion of the content 122 that most users skip. The second interest portion indicator 132 may be associated with a portion of the content 122 that most users fast forward or play the content 122 at a playback speed that is different from a default playback speed. The third interest portion indicator 134 may be associated with a portion of the content 122 that most users view.

For example, the user device 120 may present the movie "Burning Sage" and as the interest portion pointer 902 advances, the interest portion pointer 902 may depict for a first time interval associated with a span of time bracketed by time indices of 0:00:00 to 00:02:50, as the first interest portion indicator 130. As the interest portion pointer 902 continues to advance, the interest portion pointer 902 may change the depiction from the first interest portion indicator 130 to the third interest portion indicator 134 for a second time interval associated with a span of time bracketed by time indices of 00:03:00 to 00:23:32. Continuing this implementation, as the interest portion pointer 902 continues to advance, the interest portion pointer 902 may change the depiction from the third interest portion indicator 134 to the second interest portion indicator 132 for a third time interval associated with a span of time bracketed by time indices of 00:23:52 to 00:33:01. The interest portion pointer 902 may continue changing the depiction until the completion of the content 122.

Figure 10:
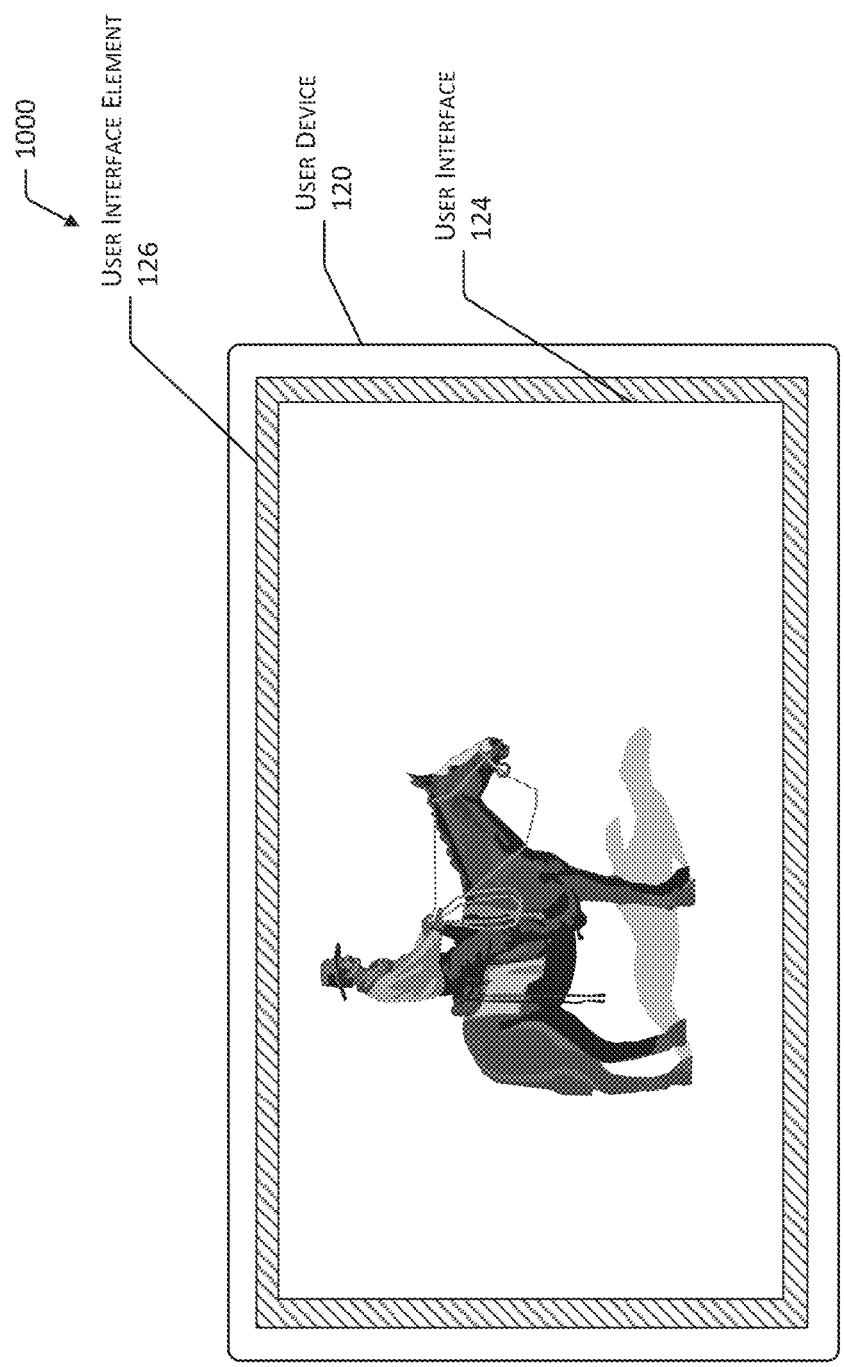
FIG. 10 depicts an example of a user interface to enable a user to view a user interface element.

FIG. 10 depicts an example 1000 user interface to enable a user to view a user interface element 126. In some implementations, the user interface 124 may be presented by the user interface module 1216 as illustrated in FIG. 12 or the user interface generator module 114 as illustrated in FIG. 1.

The user device 120 may be configured to have a user interface 124. The user interface 124 may depict the content 122. For example, the user interface 124 may depict the movie "Burning Sage."

The user interface element 126 may be configured to be arranged around an outer border of the user interface 124. In this implementation, the outer border may depict the first interest portion indicator 130, the second interest portion indicator 132, or the third interest portion indicator 134. The first interest portion indicator 130 may be associated with a portion of the content 122 that most users skip. The second interest portion indicator 132 may be associated with a portion of the content 122 that most users fast forward or play the content 122 at a playback speed that is different from a default playback speed. The third interest portion indicator 134 may be associated with a portion of the content 122 that most users view.

For example, the user device 120 may present the movie "Burning Sage" and as the viewing of "Burning Sage" advances, the user interface element 126 may depict for a first time interval associated with a span of time bracketed by time indices of 00:00:00 to 00:02:50 as the first interest portion indicator 130. As the viewing of "Burning Sage" advances, the user interface element 126 may change the depiction from the first interest portion indicator 130 to the third interest portion indicator 134 for a second time interval associated with a span of time bracketed by time indices of 00:03:00 to 00:23:32. Continuing this implementation, as the viewing of "Burning Sage" advances, the user interface element 126 may change the depiction from the third interest portion indicator 134 to the second interest portion indicator 132 for a third time interval associated with a span of time bracketed by time indices of 00:23:52 to 00:33:01. The user interface element 126 may continue changing the depiction until the completion of the content 122. In other implementations one or more of the presentation control 128, the progress pointer 206, and so forth may be presented.

FIG. 11 is a flow diagram of a process 1100 for generating heat map user interface data for content. Although the process 1100 is described with reference to the flowchart illustrated in FIG. 11, many other methods of performing the acts associated with the process 1100 may be used. For example, the order of the steps may be changed, some of the steps described may be optional, and additional steps may be included.

At 1102, the user device 102(1), 102(2), . . . , 102(D) may be configured to determine the interaction data 108(1), 108(2), . . . , 108(D) indicative of an interaction with the content 122 and a time interval with respect to the content 122 in which the interaction occurred, as described above. For example, the content 122 being presented to the user may be the movie "Burning Sage." The user device 102 may be configured to receive the user input 106 to pause the presentation of the content "Burning Sage." The user device 102 may generate the interaction data 108 indicative of the user input 106 to pause the presentation of the content 122 and send the interaction data 108 to the servers 110. The interaction data 108 may also include data indicative of a first time interval associated with a span of time bracketed by time indices of 00:03:12 to 00:47:09 of the content 122. The first time index 00:03:12 may be associated with a user input 106 to play the content and the second time index 00:47:09 may be associated with the user input 106 to pause the presentation of the content.

At 1104, the servers 110, the user interface generator module 114, or the user interface generator service 210 may be configured to determine, based on the interaction data 108(1), 108(2), . . . , 108(D), an interest portion 1106 associated with the time interval of the content 122, as described above. For example, the user may be watching the movie "Burning Sage" and the interaction with the content 122 may be to play the movie associated with the time interval 208. The time interval 208 may be associated with a span of time bracketed by time indices of 00:03:12 to 00:47:09. In this example, the first time index 00:03:12 may associated with a user input to play the content 122 and the second time index 00:47:09 may be associated with the user input 106 to pause the presentation of the content 122. In other implementations, other indexes may be used instead of or in addition to a time index, such as a frame number, chapter number, scene number, and so forth. Continuing this example, the server 110, or the user interface generator service 210 may determine that the time interval may have the interest portion 1106 corresponding to the third interest portion indicator 134. The third interest portion indicator 134 may have a visual indicator of the color green, a pattern, or shade, as described above.

At 1108, the servers 110, the user interface generator module 114, or the user interface generator service 210 may be configured to generate first instructions configured to cause depiction of a graphic representation of a playback indicator 1110 that is representative of the content 122. The servers 110, the user interface generator module 114, or the user interface generator service 210 may also be configured to generate a graphic representation of a pointer configured to depict a relative position in the content as a position on the playback indicator 1110. The playback indicator 1110 may include a progress pointer 206, 310 configured to depict a relative position in the content 122, which the user is currently at or viewing. The playback indicator 1110 may also include a time indicator duration of time associated with the content, a time index, and so forth. For example, the run time for the movie "Burning Sage" may be 02:00:00. The time indicator may depict 02:00:00 as the time associated with the content 122. The progress pointer 206, 310 may indicate the relative position in the content 122, which the user is currently at, for example, the user may be at time index 00:30:00 and the total time index for "Burning Sage" may be 02:00:000. The playback indicator 1110 may depict a graphical representation of 00:30:00/02:00:00.

In another implementation, the server 110, the user interface generator module 114, or the user interface generator service 210 may access data indicative of information about the time, time index, or frames associated with the content, as described above.

At, 1112, the server 110, the user interface generator module 114, or the user interface generator service 210 may be configured to generate the user interface data 118 configured to cause a second representation of an indicator of the interest portion 1106 associated with the time interval. The server 110, the user interface generator module 114, or the user interface generator service 210 may determine that the time interval corresponds to a portion of the playback indicator 1110 and represents the time interval via a representation provided during playback of the content 122. The server 110, the user interface generator module 114, or the user interface generator service 210 may be configured to determine the indicator, as described above. For example, the first time interval associated with a span of time bracketed by time indices of 00:03:12 to 00:47:09 of the content 122, where time index 00:03:12 may be associated with the user input 106 to play the content 122 and the time index 00:47:09 may be associated with the user input 106 to pause the presentation of the content 122. The server 110, the user interface generator module 114, or the user interface generator 210 may generate data indicative of the indicator that when the content is accessed to either depict a visual indicator such as the color green, which denotes that most users viewed this portion of the content 122 or provide another type indictor such as an audio indicator or a haptic indicator, as described above.

FIG. 12 illustrates a block diagram 1200 of a device 1202. The device 1202 may be the user device 102(1), 102(2), . . . , 102(D), 120, the server 110, the interest determination module 112, the user interface generator service 210, or the content distribution service 412. The device 1202 is illustrative and non-limiting, and may be a desktop computer, a tablet computer, server, a wearable computer, an e-book reader, a media device, a cellular phone, a laptop computer, or another suitable apparatus. The device 1202 may include one or more processors 1204 configured to execute one or more stored instructions. The processor(s) 1204 may comprise one or more cores, and may also be referred to as hardware processors.

The device 1202 may include one or more input/output (I/O) interface(s) 1206 to allow the processor(s) 1204 or other components of the device 1202 to communicate with various other devices 1202, other computing devices, the server 110, the user device 102(1), 102(2), . . . , 102(D), the user device 120, other services that may include one or more of the interest determination module 112, the user interface generator module 114, the content module 116, web-based resources, the interest determination service 406, the user interface generator service 210, the content distribution service 412, and so on. The I/O interfaces 1206 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1206 may couple to one or more I/O devices 1208. The I/O devices 1208 may include one or more input devices such as a keyboard, a mouse, a microphone 1208(1), user input buttons 1208(2), and so forth. The I/O devices 1208 may also include output devices such as audio speakers 1208(3), one or more displays 1208(4), and so forth. In some embodiments, the I/O devices 1208 may be physically incorporated within the device 1202, or they may be externally placed. The I/O devices 1208 may include various other devices as well.

The device 1202 may also include one or more communication interfaces 1210. The communication interface(s) 1210 are configured to provide communications with other devices, web-based resources, the server 110, the user device 102(1), 102(2), . . . , 102(D), the user device 120, other services that may include one or more of the interest determination module 112, the user interface generator module 114, the content module 116, the interest determination service 406, the user interface generator service 210, the content distribution service 412, routers, wireless access points, and so forth. The communication interfaces 1210 may include wireless functions, devices configured to couple to one or more networks including local area networks (LANs), wireless LANs, wide area networks (WANs), and so forth. The device 1202 may also include one or more busses or other internal communications hardware or software that allow for the transfer of data between the various modules and components of the device 1202.

The device 1202 includes one or more memories 1212. The memory 1212 comprises one or more computer-readable storage media (CRSM). The memory 1212 provides storage of computer readable instructions, which enables the user device 102(1), 102(2), . . . , 102(D), 120 to present the user interface 104(1), 104(2), . . . , 104(4), 124, the user interface element 126, the updated user interface element 212, the user interface element 302, the updated user interface element 314, or the server 110 to execute one or more of the interest determination module 112, the user interface generator module 114, the content module 116, data structures, program modules, and other data used during the operation of the user device 102(1), 102(2), . . . , 102(D), 120, or the server 110. The memory 1212 may include at least one operating system (OS) module 1214. Respective OS modules 1214 are configured to manage hardware devices such as the I/O interface(s) 1206, the I/O devices 1208, the communication interface(s) 1210, and provide various services to applications or modules executing on the processors 1204.

Also, stored in the memory 1212 may be one or more of the following modules. These modules may be executed as foreground applications, background tasks, daemons, and so forth. A user interface module 1216 may be configured to provide the user interface 104(1), 104(2), . . . , 104(4), 124, the user interface element 126, the updated user interface element 212, the user interface element 302, the updated user interface element 314, and may also provide one or more application programming interfaces. The user interface module 1216 may be configured to operate with information encoded as Hypertext Markup Language (HTML) files, Extensible Markup Language (XML) files, or in another suitable format or language. The user interface module 1216 is configured to accept inputs and send outputs using the I/O interfaces 1206, the communication interfaces 1210, or both.

The memory 1212 may also include a presentation module 1218. The presentation module 1218 may be configured to present the content 122, the user interface element 126, the updated user interface element 212, the user interface element 302, the updated user interface element 314, and so forth.

The memory 1212 may also include the interest determination module 112. The interest determination module 112 may be configured to collect the interaction data 108(1), 108(2), . . . , 108(D) indicative of the user input 106(1), 106(2), . . . , 106(D) and data indicative of a time interval associated with the user input 106(1), 106(2), . . . , 106(D), as described above.

The memory 1212 may also include the user interface generator module 114. The user interface generator module 114 may be configured to generate first user interface data 118 configured to cause depiction of a graphic representation of a line that is representative of the content 122 and a graphic representation of a pointer configured to depict a relative position in the content 122 as a position on the line, as described above.

The memory 1212 may include the content module 116. The content module 116 may be configured to receive a request from the user device 120 for the content 122 and send the content 122 to the user device 120, as described above.

The memory 1212 may also include a datastore 1220 to store information. The datastore 1220 may use a flat file, database, linked list, tree, executable code, or other data structure to store the information. In some implementations, the datastore 1220 or a portion of the datastore 1220 may be distributed across one or more user devices 102(1), 102(2), . . . , 102(D), 120, or computing devices including the server 110, network attached storage apparatus, and so forth.

The datastore 1220 may store the interaction data 108, the user interface data 118, the content 122, the aggregate data 410, the content request data 606, the content data 702, or a combination thereof. As described above, the interaction data 108 may be indicative of a user's interaction with the content 122. The user interface data 118 may be indicative of the user interface instructions, as described above. The content 122 may be indicative of the content, as described above. For example, the content 122 may be the movie "Burning Sage." The aggregate data 410 may include the interaction data 108(1), 108(2), . . . , 108(D) indicative of an interaction with the content 122, as described above. The content request data 606 may be indicative of a user request for particular content 122, as described above. The content data 702 may be indicative of the requested content 122, as described above.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A system comprising:
a server comprising:
a hardware processor that executes instructions to:
receive first interaction data indicative of an instruction to play a first time interval of content that extends from a first time in the content to a second time in the content;
classify a second time interval as being indicative of a high interest portion for which at least a threshold count of views of a portion of the first time interval of the content have occurred, wherein the second time interval is shorter than the first time interval and extends from a third time to a fourth time;

generate first user interface data to depict a graphic representation of a line that is representative of time-based playback of the content and a graphic representation of a pointer to depict a relative position in the content as a position on the line, wherein the graphic representation comprises an overlay to a portion of a user interface to depict the content, and wherein the graphic representation of the pointer comprises an overlay to the line;

generate second user interface data to depict a second user interface element comprising an overlay to the line and the portion of the user interface, the overlay depicts a first visual indicator of the high interest portion that corresponds to a portion of the line that is associated with the second time interval; and cause a user device to display the first user interface data and the second user interface data.

2. The system of claim 1, the user device comprising:
a display; and
a hardware processor that executes instructions to:
receive the first user interface data and the second user interface data; and
display the overlay to depict the first visual indicator on the line upon access of the content, the first visual indicator identifies that the second time interval of content that extends from the third time in the content to the fourth time in the content has been previously viewed by users.

3. The system of claim 1, wherein the hardware processor further executes instructions to:
receive second interaction data indicative of an instruction to play a third time interval of the content at a playback speed that is different from a default playback speed, the third time interval extends from a fifth time in the content to a sixth time in the content, wherein the third time interval is shorter than the first time interval;
classify the third time interval as being indicative of a medium interest portion; and
generate third user interface data to depict a third user interface element comprising the overlay to the line, the overlay depicts:
the first visual indicator of the high interest portion that corresponds to the portion of the line that is associated with the second time interval; and
a second visual indicator of the medium interest portion that corresponds to the portion of the line that is associated with the third time interval.

4. A method comprising:
determining interaction data indicative of an interaction with content, the interaction data including data indicative of a time interval with respect to the content in which the interaction occurred;
determining, based on the interaction data, an interest portion of the content that is associated with the time interval;
accessing data indicative of information about an index associated with the content;
determining that the time interval corresponds to a portion of the index associated with the content; and
generating user interface data indicative of:
a pointer that depicts a relative position in the content as a position on a line that is representative of time-based playback of the content, and
an indicator, comprising an overlay to the line, that represents the interest portion of the content associated with the time interval during playback of the content.

5. The method of claim 4, wherein the interest portion of the content that is associated with the time interval is one or more of:
a first interest portion associated to an interaction with the content to skip playback of the time interval of the content,
a second interest portion associated to an interaction with the content to play the time interval of the content at a playback speed that is different from a default play back speed, or
a third interest portion associated to an interaction with the content to play the time interval of the content.

6. The method of claim 4, further comprising:
determining a number of interactions with the content associated with the time interval within the content; and
generating a second user interface instruction to depict as an overlay on a presentation of the user interface data the number of interactions with the content associated with the time interval within the content, the overlay being depicted in association with a position of a cursor within the time interval by a user.

7. The method of claim 4, further comprising:
receiving a request for the content and a user interface instruction associated with a user selected time period;
accessing a datastore that includes one or more user interface instructions associated with a particular time period;
selecting the user interface instruction associated with the user selected time period; and
sending the content and the selected user interface instruction to a user device.

8. The method of claim 4, further comprising:
receiving second interaction data indicative of a second interaction with the content, the second interaction data including data indicative of a second time interval with respect to the content in which the interaction occurred;
determining, based on the second interaction data, a second interest portion of the content associated with the second time interval;
determining that the second time interval corresponds to the time interval;
determining that the second interaction data does not cause a threshold number of total interaction data for the second time interval and having the second interest portion of the content to be met or exceeded;
updating a counter associated with the second interest portion of the content to generate a total number of unique interactions with the content;
continuing to receive the second interaction data indicative of interactions with the content, the second interaction data including data indicative of the second time interval with respect to the content, the second interaction data being determined as the interest portion of the content;
determining that the second interaction data causes the threshold number of total interaction data for the second time interval and having the second interest portion of the content to be met or exceeded; and
generating a second user interface instruction to overwrite the indicator associated with the time interval to a second indicator indicative of the second interest portion of the content.

9. The method of claim 8, wherein the counter comprises an ordered list of data arranged according to time range and view rate value; and wherein particular ones of the ordered list of data are assigned a weight to be applied by the counter.

10. The method of claim 4, further comprising:
receiving second interaction data indicative of a second interaction with the content, the second interaction data including data indicative of a second time interval with respect to the content in which the interaction occurred;
determining, based on the second interaction data, a second interest portion of the content associated with the second time interval;
determining that the second time interval corresponds to the time interval;
determining that the second interaction data is associated with a particular user; and
based on the second interaction data being associated with the particular user, generating a second user interface instruction to overwrite the indicator associated with the time interval to a second indicator to represent the second interest portion of the content associated with the second time interval.

11. A system comprising:
a device comprising:
a hardware processor that executes instructions to:
determine first interaction data indicative of a first interaction with content, the first interaction data including first data indicative of a first interval of the content in which the first interaction occurred, wherein the first interval extends from a first time to a second time;
determine, based on the first interaction data, an interest portion of the content associated with the first interval;
access data indicative of information about an index associated with the content;
determine that the first interval corresponds to a portion of the index associated with the content; and
generate, during playback of the content, user interface data indicative of:
a pointer to depict a relative position in the content as a position on a line that is representative of time-based playback of the content, and
an indicator to designate the interest portion associated with the first interval.

12. The system of claim 11, wherein the hardware processor further executes instructions to:
receive second interaction data indicative of a second interaction with the content, the second interaction data including data indicative of a second interval with respect to the content in which the second interaction occurred;
determine, based on the second interaction data, a second interest portion of the content associated with the second interval;
determine that the second interval corresponds to the first interval;
determine that the second interaction data causes a threshold number of total interaction data for the second interval and having the second interest portion to be met or exceeded; and
generate second user interface data to change a first representation associated with the first interval to a second representation indicative of the second interest portion of the content.

13. The system of claim 11, further comprising:
a user device comprising:
a display; and
a hardware processor that executes instructions to:
receive the user interface data; and
execute an interaction to omit display of a portion of the content from a first index to a second index of the first interval associated with the first interaction data.

14. The system of claim 11, further comprising:
a user device comprising:
a hardware processor that executes instructions to:
receive the user interface data; and
remove portions of the content having an interval associated with interest portions indicative of a number of views for the interest portions that are below a threshold value which indicates that users have viewed the portions of the content having an interval associated with the interest portions.

15. The system of claim 11, further comprising:
a user device comprising:
a display device; and
a hardware processor that executes instructions to:
receive the user interface data; and
display, via the display device, an overlay that depicts one or more of:
a first visual indicator that denotes users have omitted to display a portion of the content,
a second visual indicator that denotes users have played the content at a playback speed that is different from a default playback speed, or
a third visual indicator that denotes users have played the content at the default playback speed associated with the first interval.

16. The system of claim 11, further comprising:
a user device comprising:
a hardware processor that executes instructions to:
receive the user interface data; and
begin playback of the content at the first interval associated with the interest portion indicative of a high interest portion.

17. The system of claim 11, further comprising:
a user device comprising:
a hardware processor that execute instructions to:
receive portions of the content having intervals associated with interest portions which indicate that users have viewed the portions of the content.

18. The system of claim 11, wherein the first interaction data further comprises one or more of:
user account information associated with a user device of the first interaction;
location information of the user device associated with the first interaction;
device information associated with the user device of the first interaction; or
time of day information associated with when the first interaction occurred; and
wherein the generation of the user interface data is based on one or more of:
the user account information,
the location information,
the device information, or
the time of day information.

19. The system of claim 11, wherein the hardware processor further executes instructions to:
receive second interaction data indicative of a second interaction to replay at least a portion the first interval of the content;
compare the first interaction data and the second interaction data to determine that the interest portion of the content is a duplicate; and
discard the second interaction data.

20. The system of claim 11, wherein the hardware processor further executes instructions to:
  receive second interaction data from a designated user, the second interaction data is indicative of a second interaction to replay at least a portion of the first interval of the content;
  compare the first interaction data and the second interaction data to determine that the interest portion of the content is a duplicate; and
  update a counter associated with the interest portion of the content to increase a total number of unique interactions with the content by a weighted value.

\* \* \* \* \*

UNITED STATES PATENT AND TRADEMARK OFFICE
CERTIFICATE OF CORRECTION

PATENT NO.         : 10,739,944 B1
APPLICATION NO.    : 15/428315
DATED              : August 11, 2020
INVENTOR(S)        : Manikanta Aditya Pasalapudi et al.

Page 1 of 1

It is certified that error appears in the above-identified patent and that said Letters Patent is hereby corrected as shown below:

In the Claims
Column 32, Claim 17, Line 39:
Currently reads: "a hardware processor that execute instructions to".
Should read: --a hardware processor that executes instructions to--.

Signed and Sealed this
Twenty-ninth Day of September, 2020

Andrei Iancu
*Director of the United States Patent and Trademark Office*